(12) United States Patent
Lee et al.

(10) Patent No.: US 12,438,964 B2
(45) Date of Patent: Oct. 7, 2025

(54) STRUCTURE HAVING ANTENNA MODULE APPLIED IN FOLDABLE ELECTRONIC DEVICE

(71) Applicant: SAMSUNG ELECTRONICS CO., LTD., Suwon-si (KR)

(72) Inventors: Sangha Lee, Suwon-si (KR); Soonho Hwang, Suwon-si (KR); Seongjin Park, Suwon-si (KR); Hyeonuk Kang, Suwon-si (KR); Youngjoon Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 282 days.

(21) Appl. No.: 18/310,096

(22) Filed: May 1, 2023

(65) Prior Publication Data
US 2023/0269315 A1   Aug. 24, 2023

Related U.S. Application Data

(63) Continuation of application No. PCT/KR2021/015332, filed on Oct. 28, 2021.

(30) Foreign Application Priority Data

Oct. 30, 2020  (KR) ........................ 10-2020-0143765

(51) Int. Cl.
*H04M 1/02* (2006.01)
*G06F 1/16* (2006.01)
(Continued)

(52) U.S. Cl.
CPC ........ *H04M 1/0216* (2013.01); *H01Q 1/2266* (2013.01); *H01Q 1/2283* (2013.01);
(Continued)

(58) Field of Classification Search
CPC ..... H04M 1/0214–0233; H04M 1/0266–0269; H04M 1/026; G06F 1/1652; G06F 1/1681; H01Q 1/243; H01Q 1/2283
See application file for complete search history.

(56) References Cited

U.S. PATENT DOCUMENTS 9,964,995 B1    5/2018   Morrison et al.
9,983,627 B1 *  5/2018   Pelissier ............... G06F 1/1681
(Continued)

FOREIGN PATENT DOCUMENTS

CN    109216868 A    1/2019
JP    2011501498 A    1/2011
(Continued)

OTHER PUBLICATIONS

Korean Notice of Patent Grant dated Aug. 11, 2025 for KR Application No. 10-2020-0143765.

*Primary Examiner* — Patrick F Marinelli
(74) *Attorney, Agent, or Firm* — Nixon & Vanderhye P.C.

(57) ABSTRACT

An electronic device may include: a first housing; a second housing coupled to the first housing through a hinge; an antenna module; and at least one processor electrically coupled to the antenna module, wherein the hinge is arranged about a first axis in an area having a first width in a third direction which is perpendicular to each of a first direction and to a second direction, which is perpendicular to the first direction and is faced by the rear side of the first housing, and the first housing has a first structure, and an arrangement portion is provided in the first structure, and the at least one processor may be configured to transmit and/or receive a signal having a frequency between 3 GHz and 100 GHz in the first direction or in a direction between the second direction and the third direction, by using the antenna module.

20 Claims, 25 Drawing Sheets

(51) Int. Cl.
*H01Q 1/22* (2006.01)
*H01Q 1/24* (2006.01)
*H01Q 21/06* (2006.01)

(52) U.S. Cl.
CPC .......... *H01Q 1/243* (2013.01); *H01Q 21/065* (2013.01); *H04M 1/026* (2013.01); *H04M 1/0262* (2013.01); *H04M 1/0268* (2013.01); *G06F 1/1652* (2013.01); *G06F 1/1681* (2013.01)

(56) References Cited

U.S. PATENT DOCUMENTS

| | | | |
|---|---|---|---|
| 10,015,897 B1* | 7/2018 | Hong | H04M 1/0268 |
| 10,108,224 B2 | 10/2018 | Tsubaki et al. | |
| 10,141,627 B2 | 11/2018 | Ritter et al. | |
| 10,141,630 B2* | 11/2018 | Kumar | G06F 1/1698 |
| 10,613,586 B2 | 4/2020 | Yamazaki | |
| 10,629,982 B2 | 4/2020 | Kim et al. | |
| 11,024,938 B2* | 6/2021 | Moon | H01Q 1/2208 |
| 11,081,808 B2* | 8/2021 | Yun | H01Q 9/065 |
| 11,392,181 B2* | 7/2022 | Yoo | H01Q 9/42 |
| 11,600,904 B2* | 3/2023 | Moon | H01Q 1/38 |
| 11,895,253 B2* | 2/2024 | Seo | H04M 1/0218 |
| 11,901,610 B2 | 2/2024 | Kim et al. | |
| 11,902,457 B2* | 2/2024 | Jin | H04M 1/0214 |
| 11,973,263 B2* | 4/2024 | Seo | H01Q 1/38 |
| 12,087,995 B2* | 9/2024 | Thakur | G06F 1/1616 |
| 12,166,271 B2* | 12/2024 | Do | H04M 1/0249 |
| 12,216,498 B2* | 2/2025 | Gu | H05K 1/18 |
| 12,272,865 B2* | 4/2025 | Lee | H01Q 1/2283 |
| 12,310,711 B2* | 5/2025 | Yi | A61B 5/4266 |
| 12,316,796 B2* | 5/2025 | Heo | H01Q 21/28 |
| 2009/0111541 A1 | 4/2009 | Kim et al. | |
| 2010/0207826 A1 | 8/2010 | Ryou et al. | |
| 2016/0118718 A1* | 4/2016 | Guterman | H01Q 5/357 |
| | | | 343/702 |
| 2017/0110786 A1* | 4/2017 | Liu | G06F 1/1641 |
| 2018/0026331 A1* | 1/2018 | Chang | H01Q 1/22 |
| | | | 343/702 |
| 2018/0254540 A1* | 9/2018 | Yoo | H01Q 1/243 |
| 2019/0006751 A1 | 1/2019 | Chen et al. | |
| 2019/0257933 A1* | 8/2019 | Nath | H01Q 21/064 |
| 2020/0153115 A1* | 5/2020 | Yun | H01Q 9/0407 |
| 2020/0183465 A1* | 6/2020 | Yoo | H01Q 1/2258 |
| 2020/0287268 A1* | 9/2020 | Moon | H01Q 1/02 |
| 2020/0333855 A1 | 10/2020 | Kim et al. | |
| 2022/0158326 A1* | 5/2022 | Lai | H01Q 1/2266 |
| 2022/0200123 A1* | 6/2022 | Thakur | G06F 1/1681 |
| 2022/0286542 A1* | 9/2022 | Seo | H01Q 1/2283 |
| 2023/0024522 A1* | 1/2023 | Yoon | H01Q 5/328 |
| 2023/0085568 A1* | 3/2023 | Jin | G06F 1/1677 |
| | | | 455/575.1 |
| 2023/0104268 A1* | 4/2023 | Do | H04M 1/026 |
| | | | 343/702 |
| 2023/0198131 A1* | 6/2023 | Lee | H01Q 1/38 |
| | | | 343/702 |
| 2023/0269315 A1* | 8/2023 | Lee | H01Q 21/06 |
| | | | 455/550.1 |
| 2023/0418328 A1* | 12/2023 | Huh | H01Q 1/243 |
| 2024/0211006 A1* | 6/2024 | Thakur | H01Q 3/06 |
| 2024/0267073 A1* | 8/2024 | Cho | H04M 1/0216 |
| 2025/0103109 A1* | 3/2025 | Williams | G06F 1/1681 |

FOREIGN PATENT DOCUMENTS

| | | |
|---|---|---|
| JP | 6465904 B2 | 1/2019 |
| KR | 20050031269 A | 4/2005 |
| KR | 20090042094 A | 4/2009 |
| KR | 101731375 B1 | 4/2017 |
| KR | 20170133952 A | 12/2017 |
| KR | 20200022161 A | 3/2020 |
| KR | 20200025439 A | 3/2020 |
| KR | 20200031607 A | 3/2020 |
| KR | 20200053768 A | 5/2020 |
| KR | 20200121199 A | 10/2020 |
| KR | 102280051 B1 | 7/2021 |

* cited by examiner

STRUCTURE HAVING ANTENNA MODULE APPLIED IN FOLDABLE ELECTRONIC DEVICE

CROSS-REFERENCE TO RELATED APPLICATIONS

This application is a continuation of International Application No. PCT/KR2021/015332 filed on Oct. 28, 2021, designating the United States, and claiming priority to Korean Patent Application No. 10-2020-0143765 filed on Oct. 30, 2020, in the Korean Intellectual Property Office, the disclosures of all of which are hereby incorporated by reference herein in their entireties.

BACKGROUND

Field

Embodiments disclosed herein relate to an antenna module application structure in a foldable electronic device.

Description of Related Art

An electronic device may include multiple antennas to transmit and/or receive signals in various frequency bands. For example, the multiple antennas may be designed to transmit and/or receive radio signals in a low band (LB), a middle band (MB), a high band (HB), or other predetermined frequency bands.

Recently, a foldable electronic device having a hinge structure to enhance portability has been released. The foldable electronic device includes two different housings connected to each other via a hinge structure and is configured to be foldable or unfoldable as the two housings rotate around the hinge structure relative to each other.

SUMMARY

Electronic devices may include an antenna module configured to support communication using signals of a high-frequency (e.g, millimeter wave (mmWave)) band, such as 5G communication. In the case of the high-frequency band used in 5G communication, directivity is outstanding compared to a legacy band, so the placement position or orientation of an antenna configured to support high frequencies is considered important in an electronic device a having limited placement space.

When an antenna module configured to support the communication of the high-frequency band, such as 5G communication, overlaps or is placed adjacent to another electronic component of a foldable electronic device, interference may occur in radiation of signals, resulting in deterioration of radiation performance of the antenna. In addition, the radiation performance of the antenna module may be changed depending on the folding state of the foldable electronic device.

In addition, when a mmWave antenna module is mounted horizontally, the antenna radiation performance may be improved compared to the case where the mmWave antenna module is mounted only vertically. However, when the mmWave antenna module is mounted horizontally, the antenna radiation may be directed toward a floor.

Through various example embodiments, it is possible to provide a method and/or device for improving radiation performance of an antenna by placing an antenna module in a portion of a structure covering a hinge structure of a foldable electronic device.

According to various example embodiments, an electronic device may include a first housing, a second housing coupled, directly or indirectly, to the first housing via a hinge to be rotatable about a first axis that oriented in a first direction relative to the first housing, an antenna module comprising at least one antenna, and at least one processor electrically connected to the antenna module. About the first axis, the hinge may be disposed in an area having a first width in a third direction perpendicular to each of the first direction and a second direction, which is perpendicular to the first direction and is faced by the rear surface of the first housing, and the first housing may include a first structure that covers the hinge within the first width. The first structure may be provided with a placement portion in which the antenna module is accommodated to form a predetermined angle with the rear surface of the first housing, and the at least one processor may be configured to transmit and/or receive a signal having a frequency between 3 GHz and 100 GHz in the first direction or in a direction between the second direction and the third direction by using the antenna module.

According to various example embodiments, an electronic device may include a first housing, a second housing coupled, directly or indirectly, to the first housing via a hinge to be rotatable about a first axis that oriented in a first direction relative to the first housing, an antenna module, a flexible display defining the front surface of the electronic device and disposed over the first housing and the second housing, at least one processor electrically connected to the antenna module. The hinge may be disposed in an area centered on the first axis and having a first width in a third direction perpendicular to each of the first direction and a second direction, which is perpendicular to the first direction and is faced by the rear surface of the first housing, and the first housing may include a first structure that covers the hinge within the first width. The first structure may be provided with a placement portion in which the antenna module is accommodated to form a predetermined angle with the rear surface of the first housing, and the at least one processor may be configured to transmit and/or receive a signal having a frequency between 3 GHz and 100 GHz in the first direction or in a direction between the second direction and the third direction by using the antenna module.

In an electronic device according to various example embodiments, by disposing an antenna module at a position adjacent to a hinge structure to be spaced apart from other electronic components of the electronic device, it is possible to further improve radiation performance of an antenna.

In an electronic device according to various example embodiments, it is possible to secure a wider space in the electronic device by disposing an antenna module in a space adjacent to the hinge structure.

Even when an electronic device according to various example embodiments is horizontally gripped, since an antenna module is located outside the gripped area, it is possible to reduce deterioration in radiation performance of the antenna module due to the gripping of the electronic device.

According to various example embodiments, an antenna module is placed adjacent to a hinge structure of an electronic device including a metallic material in order to facilitate diffusion of heat. As a result, it is possible to improve heat dissipation performance, and due to the improvement of the heat dissipation performance, it is possible to increase a period of time for maintaining transmission/reception of signals.

In addition, various effects directly or indirectly identified through the disclosure may be provided.

BRIEF DESCRIPTION OF DRAWINGS

The above and other aspects, features and advantages of certain embodiments will be more apparent from the following detailed description, taken in conjunction with the accompanying drawings, in which.

In connection with the description of the drawings, the same or similar components may be denoted by the same or similar reference numerals.

DETAILED DESCRIPTION

Hereinafter, various example embodiments will be described with reference to the accompanying drawings. However, it shall be understood that this description is not intended to limit the disclosure to specific embodiments, and that the disclosure includes various modifications, equivalents, or alternatives of the embodiments.

Figure 1A:
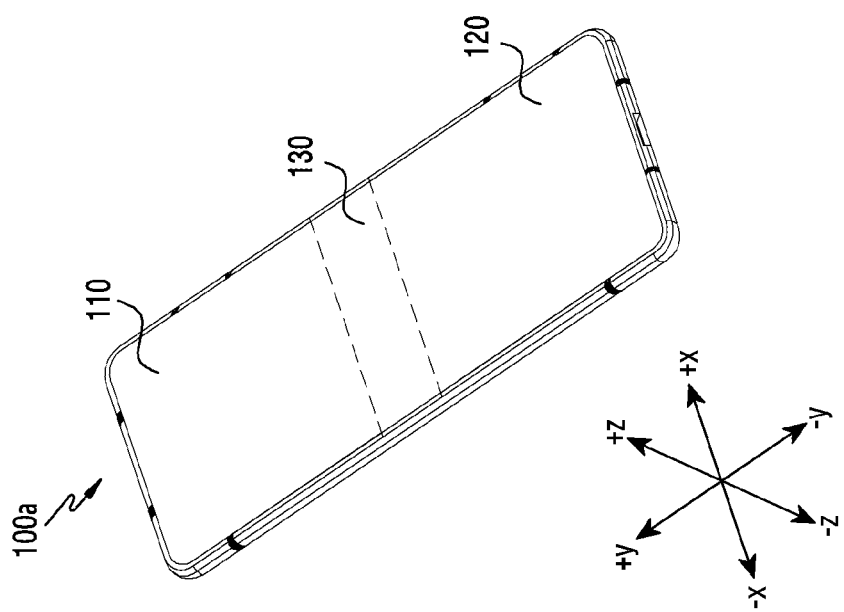
FIG. 1A is a perspective view illustrating an electronic device according to various example embodiments
Figure 1B:
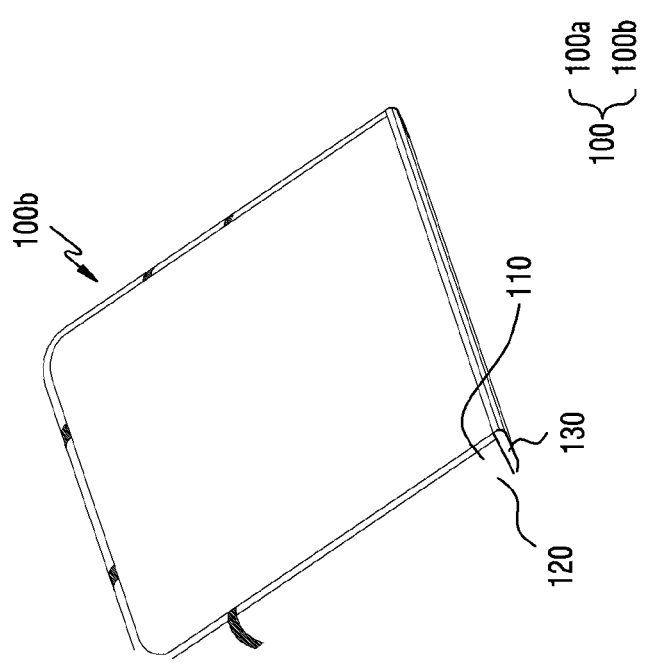
FIG. 1B is a perspective view illustrating an electronic device according to various example embodiments.

FIG. 1 is a perspective view of an electronic device 100 according to various embodiments.

Referring to FIG. 1, the electronic device 100 according to various embodiments may include a first housing 110, a second housing 120, and a hinge structure (or, hinge) 130.

According to an embodiment, the first housing 110 and the second housing 120 may be coupled, directly or indirectly, to each other via the hinge structure (or, hinge) to be rotatable about a first axis (e.g., the x-axis direction in FIG. 1) oriented in the first direction (e.g., the +x-axis direction in FIG. 1) with respect to the first housing 110. An example illustrates a structure in which the first housing 110 and the second housing 120 are foldable about the +x-axis direction or the −x-axis direction (or the "horizontal direction"), but the disclosure is not limited thereto. According to another embodiment, the first housing 110 and the second housing 120 may be folded about the +y-axis direction or the −y-axis direction (or a "vertical direction").

According to an embodiment, the rear surfaces of the first housing 110 and the second housing 120 (e.g., surfaces located in the +z-axis direction of the first housing 110) may be covered with a rear surface cover (not illustrated). In an example, at least a portion of the rear surface cover may be made of a non-conductive material.

According to an embodiment, the second housing 120 may be coupled, directly or indirectly, to the hinge structure 130. For example, the second housing 120 may rotate with the first housing 110 about the hinge structure 130.

According to an embodiment, although not illustrated in FIG. 1, a flexible display disposed over the first housing 110, the second housing 120, and the hinge structure 130 may be placed on the front surface of the electronic device 100.

Figure 2:
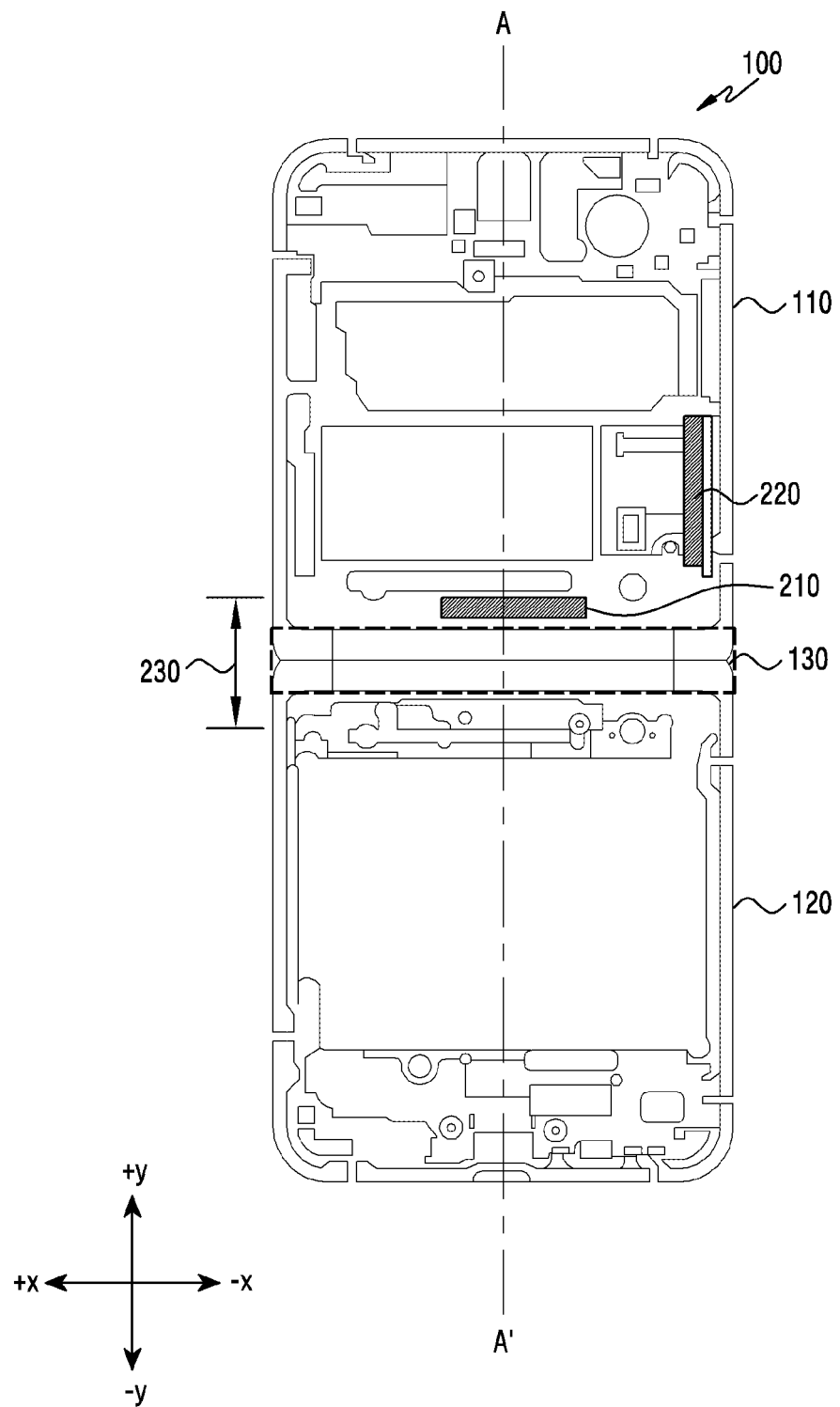
FIG. 2 is a view illustrating a first antenna element and a second antenna element placed in an electronic device according to an example embodiment.

FIG. 2 illustrates a first antenna module 210 comprising at least one antenna, and a second antenna module 220 comprising at least one antenna, disposed in the electronic device 100 according to an embodiment.

Referring to FIG. 2, the first antenna module 210 and/or the second antenna module 220 may be disposed in one area of the first housing 110.

According to an embodiment, the first antenna module 210 may include at least one array antenna including multiple antennas or a wireless communication circuit (e.g., an RFIC). For example, the antennas may include a dipole antenna, a patch antenna, a monopole antenna, or a loop antenna. In an embodiment, the first antenna module 210 may include a printed circuit board including a first surface and a second surface facing a direction opposite to the first surface, wherein an array antenna may be placed on the first surface of the printed circuit board, and a wireless communication circuit may be placed on the second surface.

According to an embodiment, the first antenna module 210 may be placed in an area that is centered on the first axis (e.g., the x-axis) and has a first width 230 in a third direction (e.g., the +y-axis direction or the −y-axis direction in FIG. 2) perpendicular to a first direction (e.g., the +x-axis direction or the −x-axis direction in FIG. 2) and a second direction which is faced by the rear surface of the first housing 110 (e.g., the +z-axis direction or the −z-axis direction). In an example, the first antenna module 210 may be placed in an area on the first housing 110 in the area having the first width 230. In another example, the first antenna module 210 may be placed in an area on the second housing 120 in the area having the first width 230. In an embodiment, the first width 230 may be greater than or equal to the width of the hinge structure (or, hinge) 130. In an embodiment, the first antenna module 210 may be placed to form a basic beam pattern between a direction which is faced by the rear surface of the first housing 110 (e.g., the −z axis direction in FIG. 1) and a direction perpendicular to the direction which is faced by the rear surface of the first housing 110 (e.g., the +y-axis direction in FIG. 2).

Herein, the beam pattern may be or include a beam pattern formed when signals having the same phase are transmitted and/or received by an antenna module (e.g., the first antenna module 210 or the second antenna module 220).

According to an embodiment, the second antenna module 220 may be placed to form a beam pattern in a direction perpendicular to the rear surface of the first housing 110. In an example, the position where the second antenna module 220 is placed may be variously changed, and the second antenna module 220 may be placed to face the same direction as or the opposite direction to the first antenna module 210. As another example, the electronic device 100 may further include an additional antenna module placed to form a beam pattern in a direction perpendicular to the direction of the beam pattern formed by the second antenna module 220.

According to an embodiment, the second antenna module 220 may form a beam pattern in the first direction (e.g., the x-axis direction of FIG. 2) or the third direction (e.g., the +y-axis direction or the −y-axis direction of FIG. 2). In an example, the second antenna module 220 may form antenna radiation in the first direction (e.g., the +x-axis direction or the −x-axis direction) perpendicular to the third direction (e.g., the +y-axis direction or the −y-axis direction of FIG. 2). In another example, the second antenna module 220 may be placed on at least a portion of the first housing 110 to be parallel to the first axis (e.g., the x axis in FIG. 2) to form a beam pattern in the third direction (e.g., the +y-axis direction or the −y-axis direction) perpendicular to the first direction (e.g., the +x-axis direction or the −x-axis direction of FIG. 2).

According to an embodiment, the first antenna module 210 and/or the second antenna module 220 may include an array antenna including multiple patch antennas. For example, the first antenna module 210 may include an array antenna including multiple patch antennas. As another example, the first antenna module 210 and/or the second antenna module 220 may include an array antenna including multiple dipole antennas. As another example, the first antenna module 210 may include an array antenna including multiple of patch antennas, and the second antenna module 220 may include an array antenna including multiple dipole antennas. As another example, the first antenna module 210 may include an array antenna including multiple dipole antennas, and the second antenna module 220 may include an array antenna including multiple patch antennas. As another example, the first antenna module 210 or the second antenna module 220 may include a first array antenna or a second array antenna. For example, the first array antenna or the second array antenna may include multiple dipole antennas or multiple patch antennas. As another example, the first array antenna or the second array antenna may be placed to form beam patterns in different directions.

According to an embodiment, a first printed circuit board (not illustrated) may be disposed in the first housing 110. In an example, the first printed circuit board (not illustrated) disposed on the first housing 110 may be connected to a second printed circuit board (not illustrated) disposed in the second housing 120 via an electrical connecting member (not illustrated). In an example, the electrical connecting member (not illustrated) may extend across at least one area of the first housing 110, the hinge structure 130, and/or at least one area of the second housing 120 to electrically connect the first printed circuit board disposed in the first housing 110 and the second printed circuit board disposed in the second housing 120. In another example, the electrical connecting member (not illustrated) may be formed of a material having a ductile (or "flexible") characteristic to be bendable in at least one area when the electronic device 100 rotates from the folded state to the unfolded state or rotates from the unfolded state to the folded state. The electrical connecting member (not illustrated) may be, for example, at least one of a signal line, a coaxial cable, or a flexible printed circuit board (FPCB), but is not limited thereto.

According to an embodiment, the first antenna module 210 and/or the second antenna module 220 may transmit and/or receive high-frequency (e.g., mmWave) signals. For example, the first antenna module 210 and/or the second antenna module 220 may transmit and/or receive signals in a frequency band of about 23 to 26 GHz and/or a frequency band of about 37 to about 42 GHz.

According to an embodiment, the first antenna module 210 and/or the second antenna module 220 may each include a printed circuit board, an antenna array, a radio frequency integrate circuit (RFIC), a power manage integrate circuit (PMIC), and/or or a module interface. In an embodiment, the first antenna module 210 and the second antenna module 220 may further include a shield member. In other embodiments, at least one of the above-mentioned components may be omitted, or at least two of the components may be integrated.

According to an embodiment, a printed circuit board included in the first antenna module 210 and/or a printed circuit board included in the second antenna module 220 may include multiple conductive layers and multiple non-conductive layers alternately stacked with the conductive layers. In an example, the printed circuit board may provide electrical connections between various electronic components disposed on the printed circuit board and/or outside the printed circuit board by using wires and conductive vias provided on or in the conductive layers.

According to an embodiment, an antenna array may include multiple antenna elements arranged to form a directional beam. In an example, the antenna elements may be provided on one surface of a printed circuit board. According to another embodiment, the antenna array may be provided inside a printed circuit board.

According to various embodiments, the antenna array may include multiple antenna arrays, which are different or the same in shape or type (e.g., dipole antenna arrays and/or patch antenna arrays).

According to an embodiment, a radio frequency integrated circuit (RFIC) may be disposed in another area of the printed circuit board that is spaced apart from the antenna array. In an example, the RFIC may be configured to process signals of a selected frequency band transmitted and/or received via the antenna array.

According to an embodiment, during transmission, the RFIC may convert a baseband signal acquired from a communication processor (not illustrated) into an RF signal of a predetermined band. In an example, during reception, the RFIC may convert an RF signal received via the antenna array into a baseband signal and transmit the converted baseband signal to the communication processor.

According to another embodiment, during transmission, the RFIC may up-convert an IF signal (of, e.g., about 9 GHz to about 11 GHz) acquired from an intermediate frequency integrated circuit (IFIC) into an RF signal of a selected band.

In an example, during reception, the RFIC may down-convert an RF signal acquired through an antenna array into an IF signal and may transmit the converted IF signal to the IFIC.

According to an embodiment, the PMIC may be disposed in another partial area of the printed circuit board that is spaced apart from the antenna array. In an example, the PMIC may receive voltage from a main PCB (not illustrated) and provide power to various components (e.g., the RFIC) on the antenna module.

According to an embodiment, a shield member may be disposed on a portion of the printed circuit board to electromagnetically shield at least one of the RFIC or the PMIC. In an example, the shield member may include a shield can.

In various embodiments, the first antenna module 210 and the second antenna module 220 may be electrically connected to another printed circuit board (e.g., a main circuit board) via a module interface comprising interface circuitry. In an example, the module interface may include, for example, a connecting member, such as a coaxial cable connector, a board-to-board connector, an interposer, or a flexible printed circuit board (FPCB). In an example, via the connecting member, the RFIC and/or the PMIC of the antenna module may be electrically connected to the other printed circuit board.

Figure 3A:
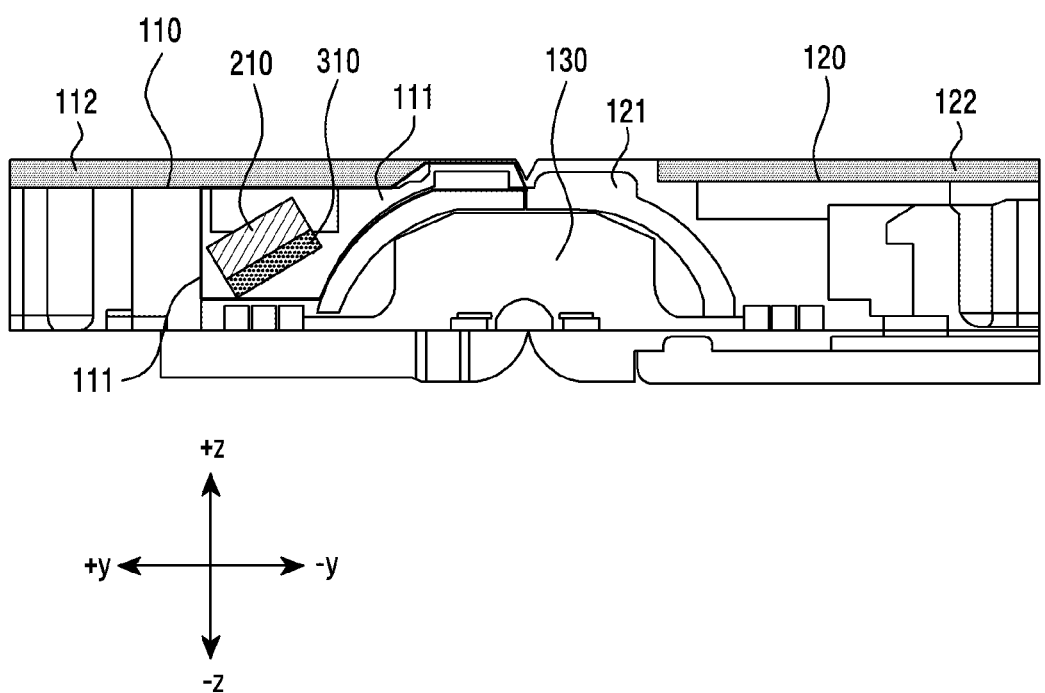
FIG. 3A illustrates a side view of an electronic device according to an example embodiment.

FIG. 3A illustrates a side view of an electronic device 100 according to an embodiment.

Figure 3B:
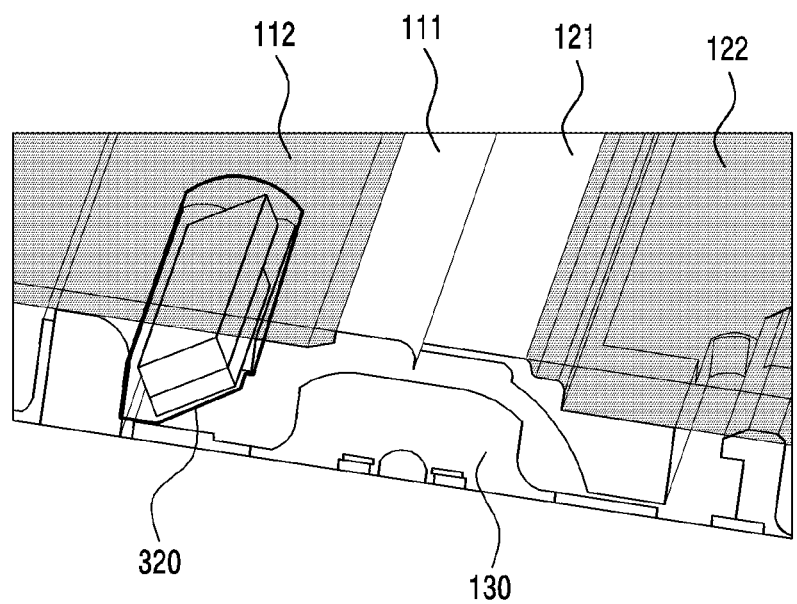
FIG. 3B illustrates a placement portion in an electronic device according to an example embodiment.

FIG. 3B illustrates a placement portion 320 (e.g., an accommodation groove) in the electronic device 100 according to an embodiment.

Referring to FIGS. 3A and 3B, according to an embodiment, at least a portion of the first housing 110 may include a first structure 111 covering the hinge structure 130. For example, the first housing 110 and the hinge structure 130 may be coupled, directly or indirectly, and the first structure 111 may be disposed in one area of the first housing 110 configured to cover at least a portion of the hinge structure 130. As another example, the first antenna module 210 may be placed in one area of the first structure 111 that is configured to cover at least a portion of the hinge structure 130 while being located adjacent to the first housing 110.

According to an embodiment, the first structure 111 may have a placement portion 320 in which the first antenna module 210 is accommodated. In an example, the placement portion 320 capable of accommodating the first antenna module 210 may be configured in a recessed shape in one area of the first structure 111.

According to an embodiment, the first antenna module 210 may be fixed to the placement portion 320 by an adhesive 310. In an example, the adhesive 310 may be a conductive tape, and the first antenna module 210 may be fixed to the placement portion 320 by the conductive tape. As another example, the first antenna module 210 may be fixed to the placement portion 320 by using other members such as a screw.

According to an embodiment, the placement portion 320 in which the first antenna module 210 is accommodated may be provided to form a predetermined angle with the rear surface of the first housing 110 (e.g., the surface of the first housing 110 located in the −z axis direction in FIG. 3). In an example, the placement portion 320 in which the first antenna module 210 is accommodated may be inclined to form an angle between 0° and 90° with the surface defined by the rear surface of the first housing 110.

According to an embodiment, since the placement portion 320 forms a predetermined angle with the rear surface of the first housing 110, the beam pattern formed by the first antenna module 210 accommodated in the placement portion 320 may be formed in a direction corresponding to a direction forming an acute angle or obtuse angle with at least one of the first direction (e.g., the +X-axis direction or the −x-axis direction of FIG. 1), the second direction (e.g., the +z-axis direction or the −z-axis direction of FIG. 3), or the third direction (e.g., the +y-axis direction or the −y-axis direction of FIG. 3). For example, at least one processor (not illustrated) included in the electronic device 100 may be configured to transmit and/or receive mmWave signals corresponding to a direction forming an angle of 45° with each of the +z-axis direction of FIG. 3 and the +y-axis direction of FIG. 3 by using the first antenna module 210. As another example, the at least one processor (not illustrated) may be configured to transmit and/or receive mmWave signals corresponding to a direction forming an angle of 45° with each of the +z-axis direction of FIG. 3 and the −y-axis direction of FIG. 1 by using the first antenna module 210. As another example, the at least one processor (not illustrated) may be configured to transmit and/or receive mmWave signals corresponding to a direction forming a predetermined angle with each of the +x-axis direction of FIG. 1, the +z-axis direction of FIG. 3, and the −y-axis direction of FIG. 3 by using the first antenna module 210.

According to an embodiment, a first rear surface plate 112 may be provided on the rear surface of the first housing 110, and a second rear surface plate 122 may be provided on the rear surface of the second housing 120. In an example, the first rear surface plate 112 and/or the second rear surface plate 122 may be made of a non-conductive material (e.g., glass, polymer, or ceramic). In another embodiment, the first housing 110 and the first rear surface plate 112 may be integrated. In another embodiment, the second housing 120 and the second rear surface plate 122 may be integrated.

According to an embodiment, the second housing 120 may include a second structure 121 covering the hinge structure 130.

With reference to FIGS. 3A and 3B, a configuration in which the first housing 110 may include the first structure 111 and the first antenna module 210 is placed in the placement portion 320 provided in the first structure has been mainly described, but the configuration described with reference to FIGS. 3A and 3B may be equally applied to the second housing 120. For example, in another embodiment, the second housing 120 may include a second structure 121 (or an additional structure), and an additional antenna module may be placed in an additional placement portion provided in the second structure 121. As another example, in another embodiment, the electronic device 100 may include both the first antenna module 210 placement on the placement portion 320 in the first structure 111 and the additional antenna module placed in the additional placement portion in the second structure 121 of the second housing 120.

Figure 4:
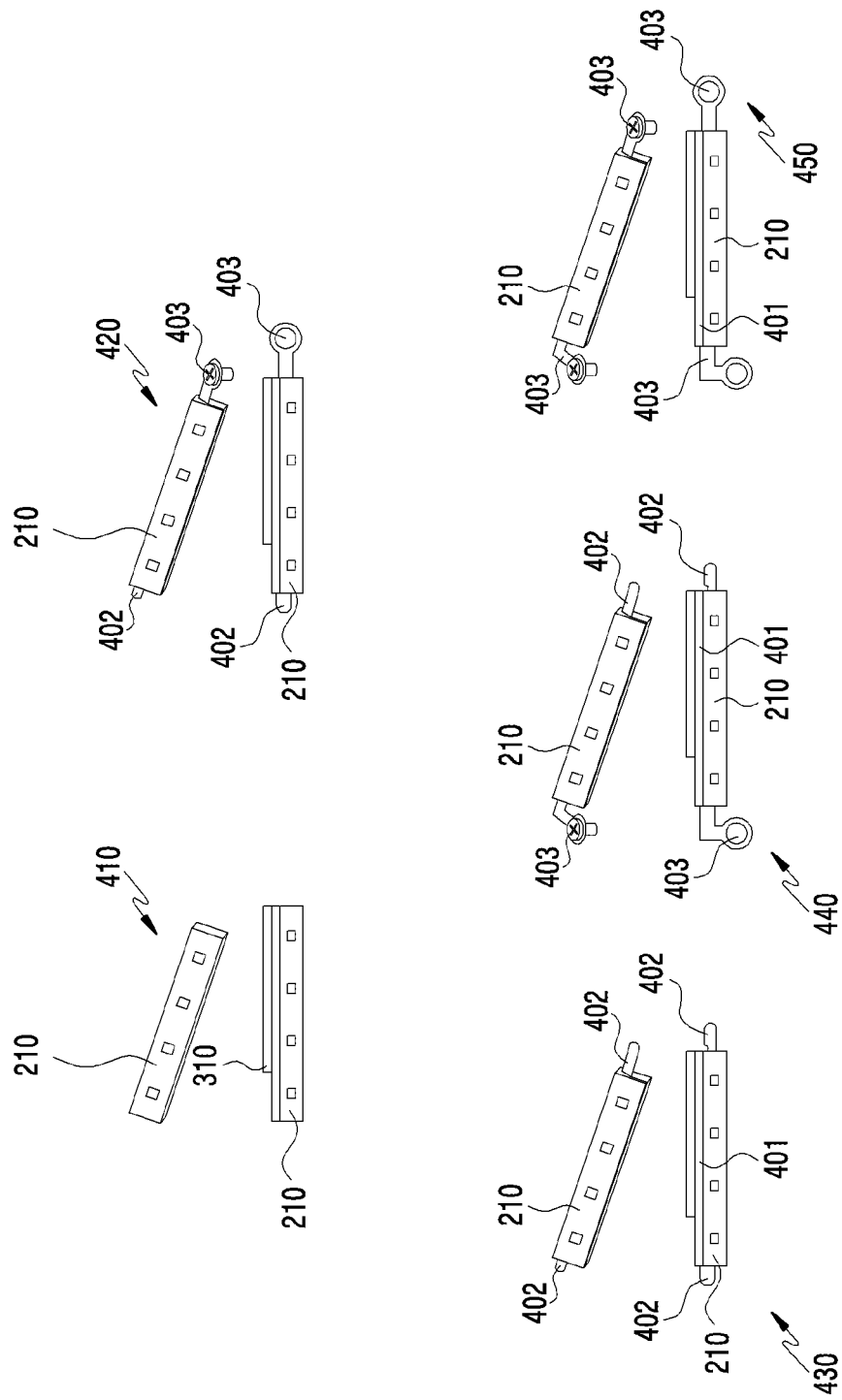
FIG. 4 illustrates assemblies in each of which a first antenna module, an adhesive, and various types of fasteners are coupled according to an example embodiment.

FIG. 4 illustrates assemblies 410, 420, 430, 440, and 450 to each of which a first antenna module 210, an adhesive 310, and fasteners according to an embodiment are coupled, directly or indirectly.

Referring to FIG. 4, a first antenna module 210 may be fixed to the placement portion 320 by an adhesive 310, a support member 401, or various types of fasteners 402 and 403.

According to an embodiment, a first assembly 410 may include a first antenna module 210 and an adhesive 310. In an example, the first antenna module 210 included in the first assembly 410 may be fixed to the placement portion 320 by the adhesive 310. For example, since the first assembly 410 is fixed to the placement portion 320 by the adhesive 310, the first antenna module 210 may be placed while being fixed to one area of the first housing 110.

According to an embodiment, a second assembly 420 may include a first antenna module 210, a hook 402, and a screw 403. In an embodiment, the second assembly 420 may include a hook 402 and a screw 403 at each of opposite ends of the support member 401. In an example, the second assembly 420 may include the hook 402 at one of opposite ends of the support member 401 and the screw 403 at the other end. According to an embodiment, the support member 401 may be fixed to one area of the first housing 110 by the hook 402 and the screw 403. For example, the first antenna module 210 coupled to or fixed to the support member 401 may be placed in while being fixed to one area of the first housing 110 by the hook 402 and the screw included in the support member 401. For example, the first structure 111 may include a structure into which the hook 402 can be fastened and a hole into which the screw 403 can be inserted.

According to an embodiment, a third assembly 430 may include a first antenna module 210 or a support member 401. In an example, the first antenna module 210 included in the third assembly 430 may be coupled and fixed to the support member 401, and the support member 401 may be connected to the placement portion 320 via the hook 402. For example, the first structure 111 may include at least one structure to which the hook 402 can be fastened.

According to an embodiment, the support member 401 may include a hook 402 at each of opposite ends. In an example, the support member 401 may be fixed to one area of the first housing 110 by two hooks 402. For example, the third assembly 430 may be disposed while being fixed to the placement portion 320 by the two hooks 402 connected to the support member 401.

According to an embodiment, a fourth assembly 440 may include a first antenna module 210 or a support member 401. In an embodiment, the support member 401 may include a screw 403 at one end and a hook 402 at the other end. In an example, the first antenna module 210 included in the fourth assembly 440 may be coupled, directly or indirectly, and fixed to the support member 401, and the support member 401 may be connected to the placement portion 320 via the screw 403 and the hook 402.

According to an embodiment, a fifth assembly 450 may include a first antenna module 210 and a support member 401. In an embodiment, the support member 401 may include a screw 403 at each of opposite ends. In an example, the first antenna module 210 included in the fifth assembly 450 may be coupled, directly or indirectly, and fixed to the support member 401. In an example, the support member 401 may be disposed while being fixed to the placement portion 320 by two screws 403.

Figure 5A:
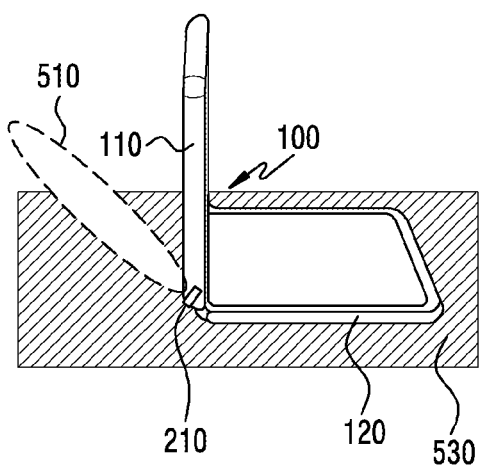
FIG. 5A illustrates antenna radiation by a first antenna module when an electronic device is used while being placed on a floor according to an example embodiment.
Figure 5B:
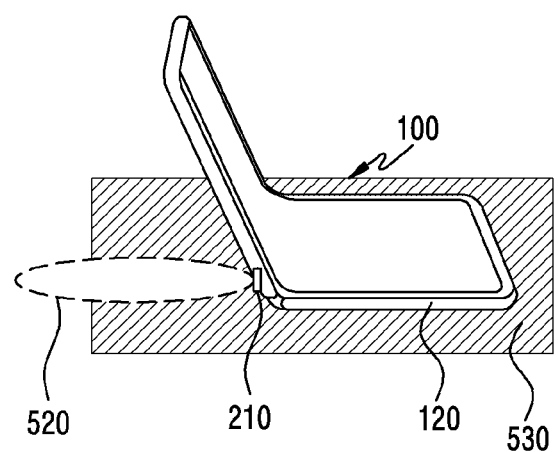
FIG. 5B illustrates antenna radiation by a first antenna module when an electronic device is used while being placed on a floor according to an example embodiment.

FIG. 5 illustrates beam patterns formed by the first antenna module 210 when the electronic device 100 according to an embodiment is used while being placed on the floor 530.

(a) of FIG. 5 illustrates a case where the first housing 110 and the second housing 120 of the electronic device 100 are substantially perpendicular to each other, and (b) of FIG. 5 illustrates a case where the first housing 110 and the second housing 120 of the electronic device 100 form an obtuse angle.

Referring to FIG. 5, when the first antenna module 210 is placed in the placement portion 320 to form a beam pattern 510 or 520 in the +y-axis direction while forming a predetermined angle (e.g., an angle between 0° and 90°) with the rear surface of the first housing 110 (e.g., the surface of the first housing 110 located in the +z-axis direction in FIG. 1), the beam pattern 510 or 520 formed by the first antenna module 210 may not be directed toward the floor 530 depending on the state of the electronic device 100. When the beam pattern 510 or 520 formed by the first antenna module 210 faces a beam pattern of a base station, radiation efficiency by the first antenna module 210 may increase, and when the beam pattern 510 or 520 formed by 210 does not face a beam pattern of the base station, for example, when the beam patterns 510 are 520 is directed to the floor 530, radiation efficiency by the first antenna module 210 may decrease.

According to an embodiment, when the first antenna module 210 is placed in the placement portion 320 to form a beam pattern 510 or 520 in a direction between the −z axis and they axis of FIG. 1 while forming a predetermined angle (e.g., an angle between 0° and 90°) with the rear surface in a case where the first housing 110 and the second housing 120 of the electronic device 100 are substantially perpendicular to each other, a first beam pattern 510 formed by the first antenna module 210 may not be directed to the air rather than being directed to the floor 530. In an example, since the first beam pattern 510 formed by the first antenna module 210 is not directed to the floor 530, the radiation performance of the first antenna module 210 may be improved.

According to an embodiment, when the first antenna module 210 is placed in the placement portion 320 to form a beam pattern 510 or 520 in a direction between the −z axis and the +y axis of FIG. 1 while forming a predetermined angle (e.g., an angle between 0° and 90°) in the case where the first housing 110 and the second housing 120 of the electronic device 100 form an obtuse angle, a second beam pattern 530 formed by the first antenna module 210 may not be directed to the floor depending on the angle between the housing 110 and the second housing 120. In an example, since the second beam pattern 520 formed by the first antenna module 210 is parallel to the floor 530 rather than being directed to the floor 530, the radiation performance of the first antenna module 210 may be improved.

Figure 6:
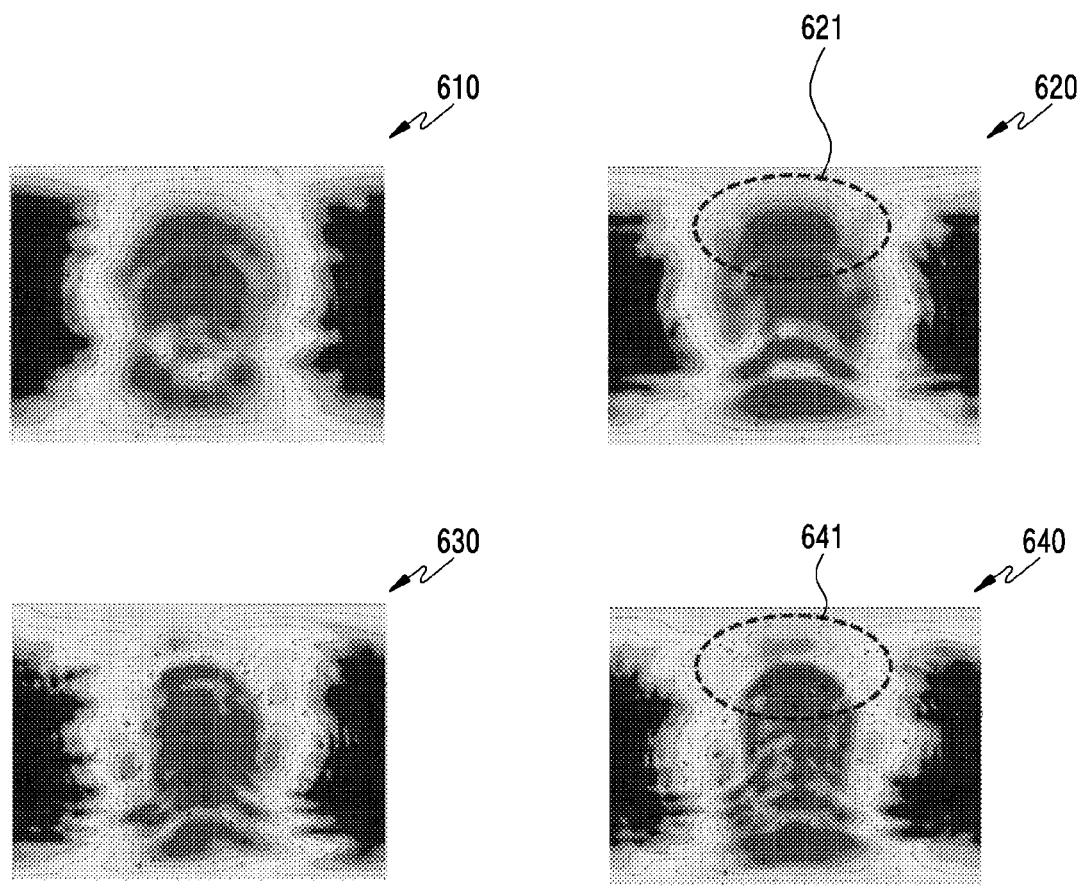
FIG. 6 illustrates antenna radiation pattern graphs when a first housing and a second housing are on the same plane according to an example embodiment.

FIG. 6 illustrates radiation pattern graphs when the first housing 110 and the second housing 120 according to an embodiment are on the same plane.

Graphs 610 and 620 show radiation patterns of the electronic device 100 in a low-frequency band, and graphs 630 and 640 show radiation patterns of the electronic device 100 in a high-frequency band. In an example, the low-frequency band may correspond to about 24.25 GHz, and the high-frequency band may correspond to about 40 GHz.

Referring to FIG. 6, in a case where the first housing 110 and the second housing 120 are present on the same plane (e.g., when the electronic device 100 is unfolded), when the first antenna module 210 is placed in the placement portion 320 to form a beam pattern (e.g., the beam pattern 510 or 520 in FIGS. 5A and 5B) in a direction between the −z-axis direction and the +y-axis direction of FIG. 1 while forming a predetermined angle (e.g., an angle between 0° and 90°) with the rear surface of the first housing 110 (e.g., the surface of the first housing 110 located in the +z axis direction in FIG. 1), the radiation performance may be improved when the first antenna module 210 is placed in the placement portion to form a pattern in a direction which is faced by the rear face of the first housing.

According to an embodiment, comparing graphs 610 and 620, in a case where the first housing 110 and the second housing 120 are on the same plane in the low-frequency band (e.g., the frequency band of about 24.25 GHz), when the first antenna module 210 is placed in the placement portion 320 to form a beam pattern (e.g., the beam pattern 510 or 520) in a direction between the −z axis and the +y axis while forming a predetermined angle (e.g., an angle between 0° and 90°) with the rear surface of the first housing 110 (e.g., the surface of the first housing 110 located in the +z-axis direction in FIG. 1), the radiation performance at least in a first area 621 of the first housing 110 (e.g., one area of the first housing 110 disposed at the +y-axis direction in FIG. 1 with reference to the antenna module 210) may be improved compared to the case where the first antenna module 210 is placed in the placement portion 320 to form a beam pattern in a direction which is faced by the rear surface of the first housing 110.

According to an embodiment, comparing graphs 630 and 640, in a case where the first housing 110 and the second housing 120 are on the same plane in the high-frequency band (e.g., the frequency band of 40 GHz), when the first antenna module 210 is placed in the placement portion 320 to form a beam pattern (e.g., the beam pattern 510 or 520) in a direction between the −z axis and the +y axis while forming a predetermined angle (e.g., an angle between 0° and 90°) with the rear surface of the first housing 110 (e.g., the surface of the first housing 110 located in the +z-axis direction in FIG. 1), the radiation performance at least in a second area 641 (e.g., one area of the first housing 110 disposed at the +y-axis direction with reference to the first antenna module 210) may be improved compared to the case where the first antenna module 210 is placed in the placement portion 320 to form a beam pattern in a direction which is faced by the rear surface of the first housing 110.

Figure 7:
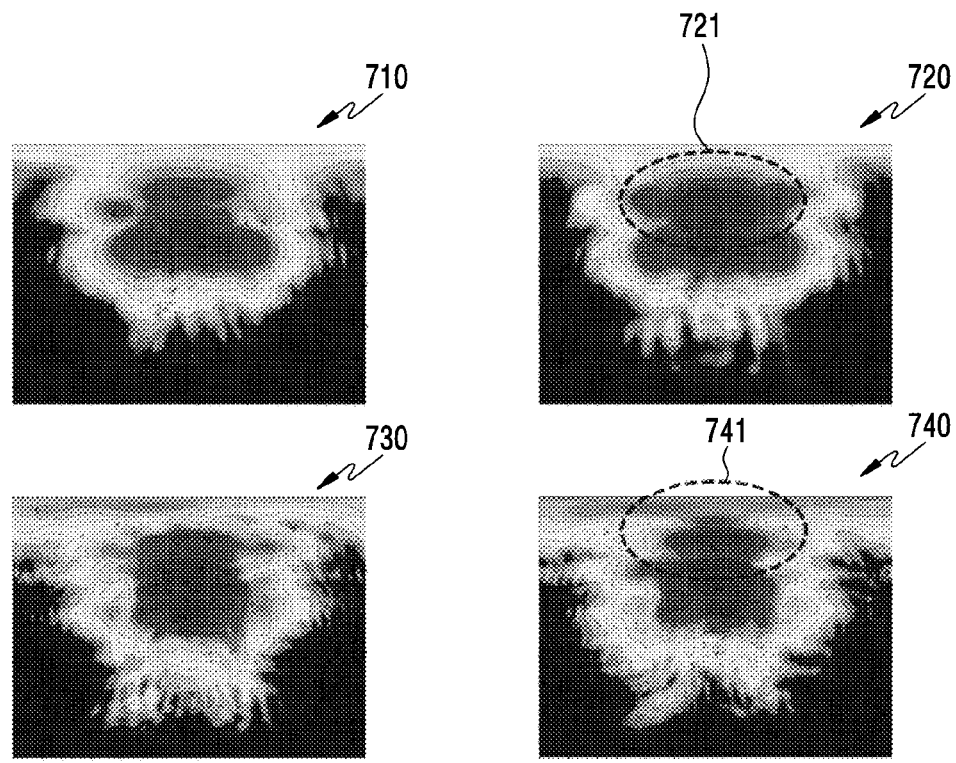
FIG. 7 illustrates antenna radiation pattern graphs when a first housing and a second housing are perpendicular to each other according to an example embodiment.

FIG. 7 illustrates radiation pattern graphs when the first housing 110 and the second housing 120 according to an embodiment are perpendicular to each other.

Graphs 710 and 720 show radiation patterns of the electronic device 100 in a low-frequency band, and graphs 730 and 740 show radiation patterns of the electronic device 100 in a high-frequency band. In an example, the low-frequency band may correspond to about 24.25 GHz, and the high-frequency band may correspond to about 40 GHz.

Referring to FIG. 7, in a case where the first housing 110 and the second housing 120 are not present on the same plane (e.g., when the electronic device 100 is in an intermediate state between the unfolded and the folded), when the first antenna module 210 is placed in the placement portion 320 to form beam patterns in a direction between the −z-axis direction and the +y-axis direction of FIG. 1 while forming a predetermined angle (e.g., an angle between 0° and 90°) with the rear surface of the first housing 110 (e.g., the surface of the first housing 110 located in the +z axis direction in FIG. 1), the radiation performance may be improved in at least in a partial area of the electronic device compared to the case where the first antenna module 210 is placed in the placement portion to form a pattern in a direction which is faced by the rear face of the first housing 110.

According to an embodiment, comparing graphs 710 and 720, in a case where the first housing 110 and the second housing 120 are not on the same plane in the low-frequency band (e.g., the frequency band of 24.25 GHz), when the first antenna module 210 is placed in the placement portion 320 to form a beam pattern in a direction between the −z axis and the +y axis while forming a predetermined angle (e.g., an angle between 0° and 90°) with the rear surface of the first housing 110 (e.g., the surface of the first housing 110 located in the +z-axis direction in FIG. 1), the radiation performance at least in a third area 721 of the first housing 110 (e.g., one area of the first housing 110 disposed at the +y-axis direction in FIG. 1 with reference to the antenna module 210) may be improved compared to the case where the first antenna module 210 is placed in the placement portion 320 to form a beam pattern in a direction which is faced by the rear surface of the first housing 110.

According to an embodiment, comparing graphs 730 and 740, in a case where the first housing 110 and the second housing 120 are on the same plane in the high-frequency band (e.g., the frequency band of 40 GHz), when the first antenna module 210 is placed in the placement portion 320 to form a beam pattern in a predetermined angle (e.g., an angle between 0° and 90°) with the rear surface of the first housing 110 (e.g., the surface of the first housing 110 located in the +z-axis direction in FIG. 1), the radiation performance at least in a fourth area 741 of the first housing 110 (e.g., one area of the first housing 110 disposed at the +y-axis direction in FIG. 1 with reference to the antenna module 210) may be improved compared to the case where the first antenna module 210 is placed in the placement portion 320 to form a beam pattern in a direction which is faced by the rear surface of the first housing 110.

Figure 8:
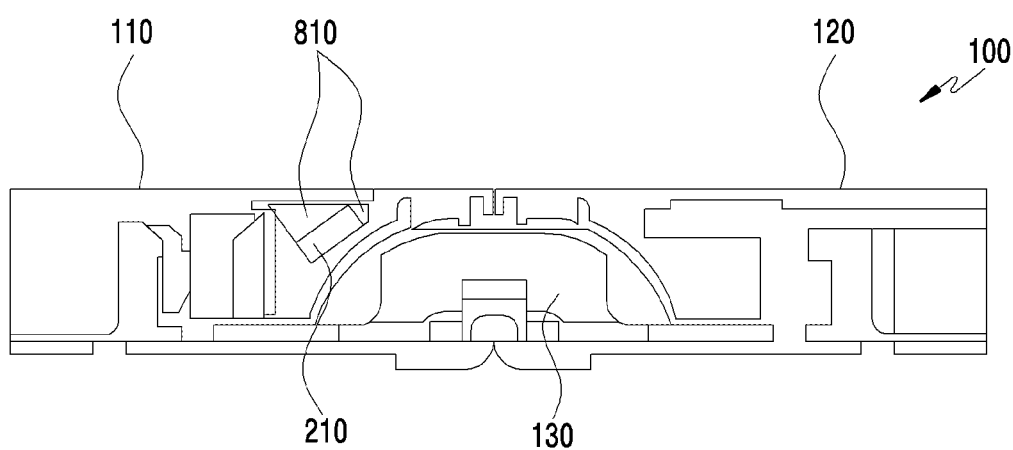
FIG. 8 illustrates a first antenna module and a non-conductive material disposed in a placement portion according to an example embodiment.

FIG. 8 illustrates a first antenna module 210 and a non-conductive material 810 provided in a placement portion 320 according to an embodiment.

Referring to FIG. 8, the space excluding the first antenna module 210 in the placement portion 320 where the first antenna module 210 is placed may be filled with the non-conductive material 810.

According to an embodiment, the non-conductive material 810 may be made of an insulating material. For example, the non-conductive material 810 may be made of a high-molecular compound, ceramic, or resin having an insulating property.

According to an embodiment, the non-conductive material 810 may not substantially affect antenna radiation of the first antenna module 210 by being made of an electrically insulating material. For example, even when a beam pattern formed by the first antenna module 210 passes through the non-conductive material 810, transmission and/or reception of signals via the first antenna module 210 may not be substantially affected.

According to an embodiment, the space excluding the first antenna module 210 in the placement portion 320 in which the first antenna module 210 is placed may be filled with air.

According to an embodiment, the placement portion 320 and the non-conductive material 810 may be integrated.

Figure 9A:
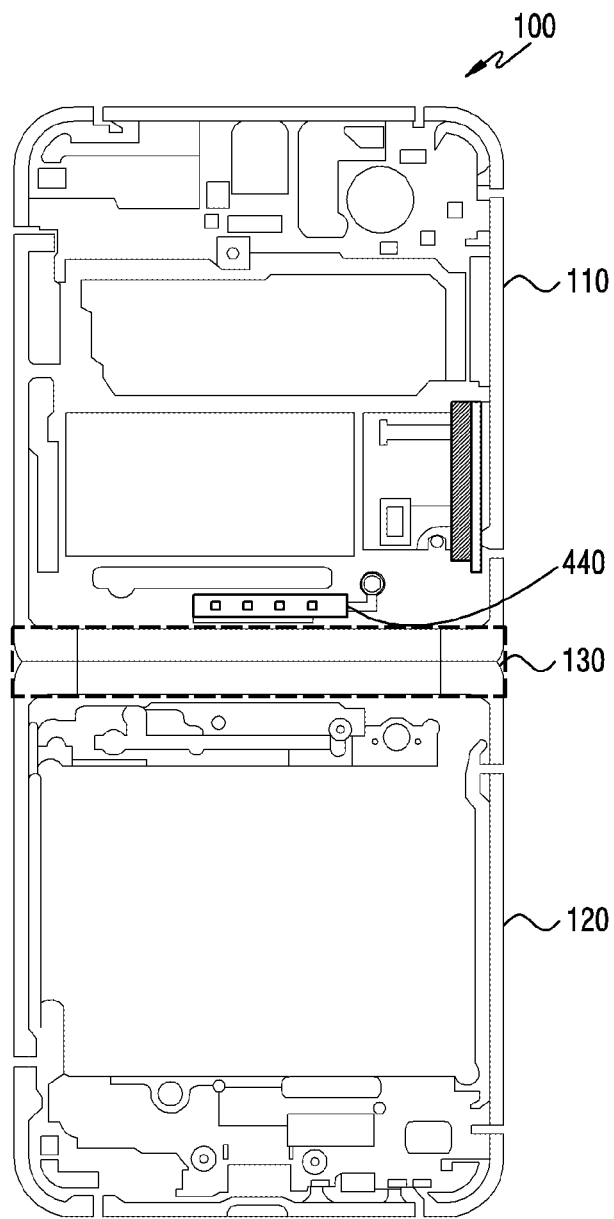
FIG. 9A illustrates a rear surface of an electronic device in which a first antenna module coupled to a fourth assembly is placed according to an example embodiment.

FIG. 9A illustrates a rear surface of the electronic device 100 in which the first antenna module 210 coupled, directly or indirectly, to the fourth assembly 440 according to an embodiment is disposed.

Figure 9B:
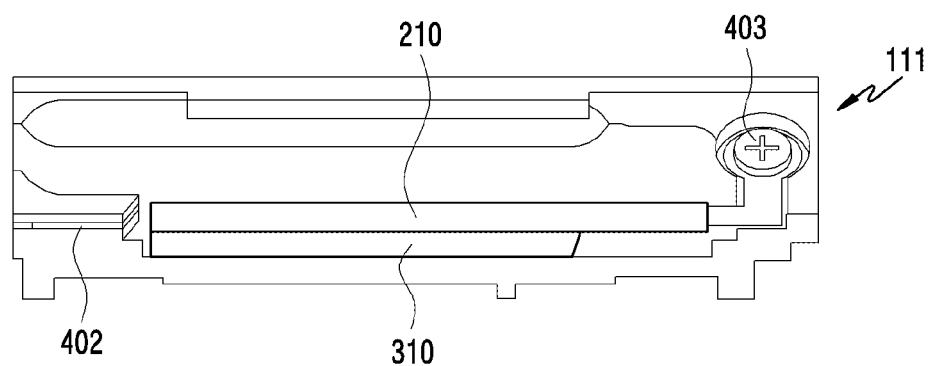
FIG. 9B is a perspective view illustrating the first antenna module coupled to the fourth assembly according to an example embodiment.

FIG. 9B is a perspective view illustrating the first antenna module 210 coupled, directly or indirectly, to the fourth assembly 440 according to an embodiment.

Figure 9C:
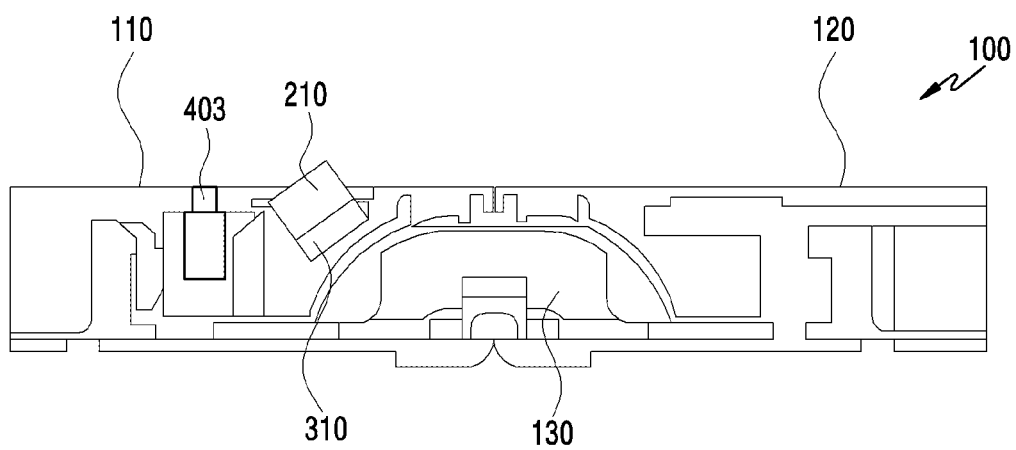
FIG. 9C is a cross-sectional view illustrating the first antenna module coupled to the fourth assembly according to an example embodiment.

FIG. 9C is a cross-sectional view taken along line A-A' of FIG. 2, illustrating the first antenna module 210 coupled, directly or indirectly, to the fourth assembly 440 according to an embodiment.

Referring to FIGS. 9A, 9B, and 9C, the fourth assembly 440 may be disposed in one area of the first housing 110 of the electronic device 100 according to an embodiment, and the fourth assembly 440 may be fixed to the first housing 110.

According to an embodiment, the first antenna module 210 may be fixed to the first housing 110 by a support member 401. For example, the first antenna module 210 may be fixed to the placement portion 320 by the support member 401. In an embodiment, the support member 401 may include a hook 402 and/or a screw 403. As another example, the first antenna module 210 may be fixed to the first housing 110 through various methods using a support member 401 including a hook 402 or a screw 403 or an adhesive 310 as described with reference to FIG. 4.

According to an embodiment, the first antenna module 210 may be fixed to the first housing 110 by inserting the hook 402 of the support member 401 into at least a portion of the first housing 110 and connecting the screw 403 to at least a portion of the first housing 110 via a thread.

Figure 10A:
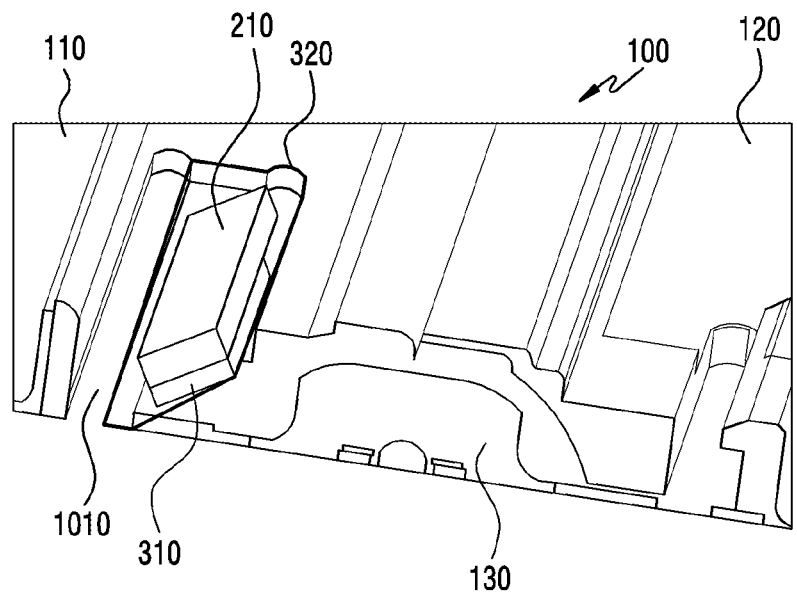
FIG. 10A illustrates an electronic device in a case where air is disposed in an area in which the first antenna module forms a beam according to an example embodiment.
Figure 10A:
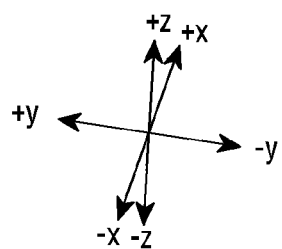
Figure 10B:
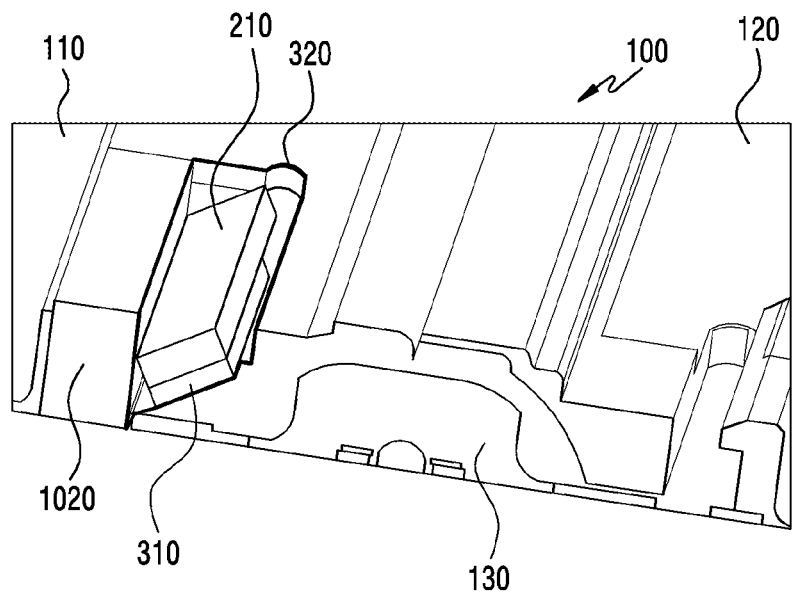
FIG. 10B illustrates an electronic device in a case where a conductive material is disposed in an area in which the first antenna module forms a beam according to an example embodiment.
Figure 10C:
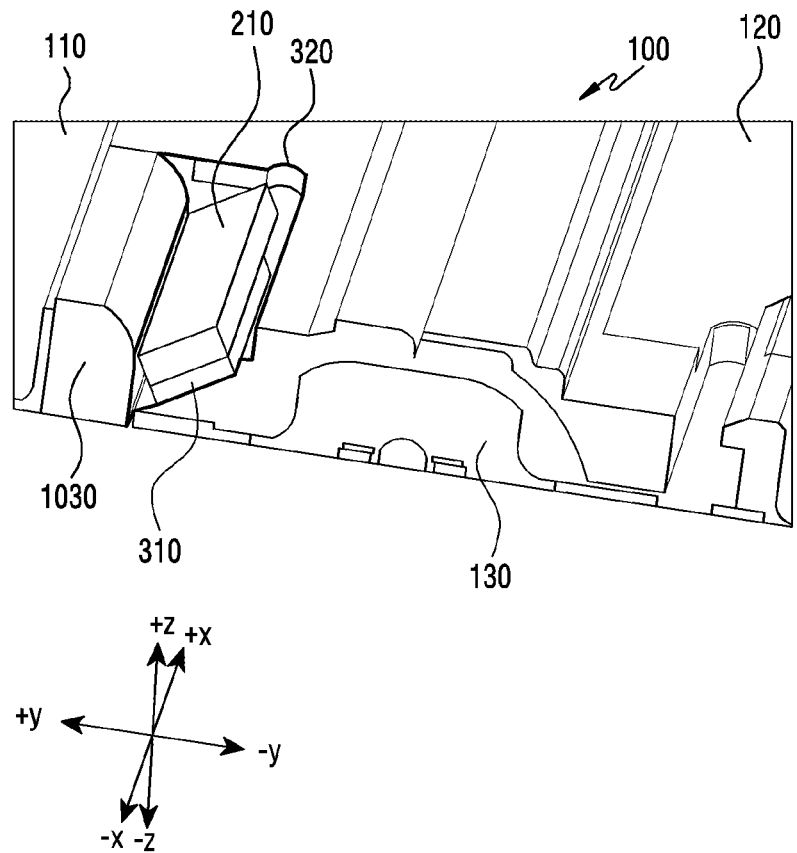
FIG. 10C illustrates an electronic device in case that an area that a beam of the first antenna module is formed of a conductive material at least partially including a curved surface according to an example embodiment.
Figure 10D:
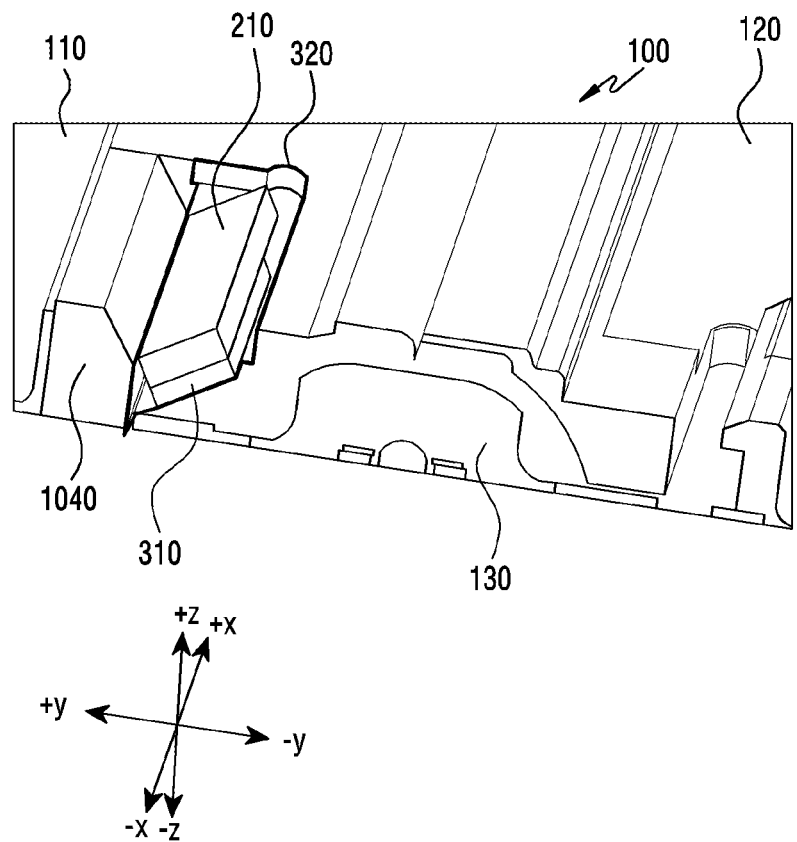
FIG. 10D illustrates an electronic device in case that an area that a beam of the first antenna module is formed of a conductive material at least partially including an oblique line according to an example embodiment.

FIG. 10A illustrates an electronic device 100 in case that an area that a beam of the first antenna module 210 forms is formed of air 1010 according to an embodiment. FIG. 10B illustrates an electronic device 100 in case that an area that a beam of the first antenna module 210 is formed of a conductive material 1020 according to an embodiment. FIG. 10C illustrates an electronic device 100 in case that an area that a beam of the first antenna module 210 is formed of a conductive material 1030 at least partially including a curved surface according to an embodiment. FIG. 10D illustrates an electronic device 100 in case that an area that a beam of the first antenna module 210 is formed of a conductive material 1040 at least partially including an oblique line according to an embodiment. The conductive material 1030 may be understood as a conductive structure substantially including a conductive material (e.g., metal).

Referring to FIGS. 10A, 10B, 10C, and 10D, when the first antenna module 210 is placed in the placement portion 320 to form a beam pattern in a direction between the −z axis and the +y axis of FIG. 10A, 10B, 10C, or 10D while forming a predetermined angle (e.g., an angle between 0° and 90°) with the rear surface of the first housing 110 (e.g., the surface of the first housing 110 located in the +z-axis direction in FIG. 10A, 10B, 10C, or 10D), air 1010, a conductive material 1020, a conductive material 1030 at least partially including a curved surface, or a conductive material 1040 at least partially including an oblique line may be disposed in the area where the first antenna module 210 forms the beam pattern.

According to an embodiment, when the first antenna module 210 is disposed in the placement portion 320 to form a beam pattern in a direction between the −z axis and the +y axis of FIG. 10A while forming a predetermined angle (e.g., an angle between 0° and 90°) with the rear surface of the first housing 110 (e.g., the surface of the first housing 110 located in the +z axis direction in FIG. 10A), the beam pattern of the first antenna module 210 may not be significantly affected by signal radiation due to air 1010 when the air 1010 is disposed in the area where the first antenna module 210 forms the beam pattern. For example, the area where the first antenna module 210 forms the beam pattern may be a space in which no configuration or structure is disposed. In an example, even if the beam pattern of the first antenna module 210 passes through an area where the air 1010 having a permittivity of 1 is disposed, transmission and/or reception of a signal via the first antenna module 210 may not be significantly affected.

According to an embodiment, in the case where the first antenna module 210 is disposed in the placement portion 320 to form a beam pattern in a direction between the −z axis and the +y axis of FIG. 10B, 10C, or 10D while forming a predetermined angle (e.g., an angle between 0° and 90°) with the rear surface of the first housing 110 (e.g., the surface of the first housing 110 located in the +z axis direction in FIG. 10B, 10C, or FIG. 10D), when the conductive material 1020 is disposed in the area where the first antenna module 210 forms the beam pattern, the beam pattern of the first antenna module 210 may be influenced by the conductive material 1020 in transmission and/or reception of signals. However, when a conductive material 1030 at least partially including a curved surface or a conductive material 1040 at least partially including an oblique line is disposed in the area where the first antenna module 210 forms a beam, the influence of the conductive material 1030 or the conductive material 1040 on the beam pattern of the first antenna module 210 on transmission and/or reception of signals via the first antenna module 210 may be reduced by the curved surface of the conductive material 1030 or the oblique line portion of the conductive material 210.

Figure 10E:
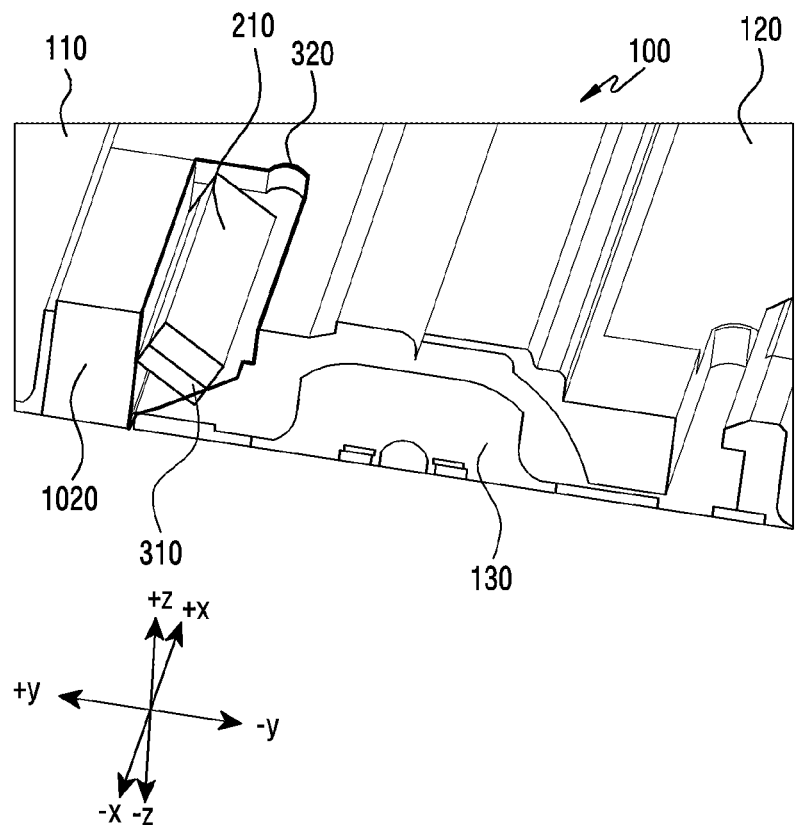
FIG. 10E illustrates an electronic device in case that the first antenna module faces a hinge structure while forming a predetermined angle with respect to the rear surface of the first housing and a third direction according to an example embodiment.

FIG. 10E illustrates an electronic device 100 in which the first antenna module 210 is disposed in the placement portion 320 to form a beam pattern in a direction between the −z axis and the −y axis of FIG. 10E while forming a predetermined angle (e.g., an angle between 0° and 90°) with the rear surface of the first housing 110 (e.g., the surface of the first housing 110 located in the +z axis direction in FIG. 10E).

Referring to FIG. 10E, in an embodiment, one surface of the placement portion 320 on which the first antenna module 210 is disposed may be provided to face a direction between the −z axis and −y axis of FIG. 10E.

According to an embodiment, the first antenna module 210 may be fixed to the placement portion 320 by an adhesive 310. The placement portion 320 in which the first antenna module 210 is disposed may be provided to be tilted by a predetermined angle to form a beam pattern (e.g., the beam pattern 510 or 520 in FIG. 5) in a direction between the −z axis and the −y axis of FIG. 10E while forming a predetermined angle with the rear surface of the first housing 110. For example, the first antenna module 210 may be placed in the placement portion 320 to form a beam pattern toward the hinge structure 130 while forming an angle of 45° with respect to the rear surface of the first housing 110 and the −y axis direction of FIG. 1.

Figure 10F:
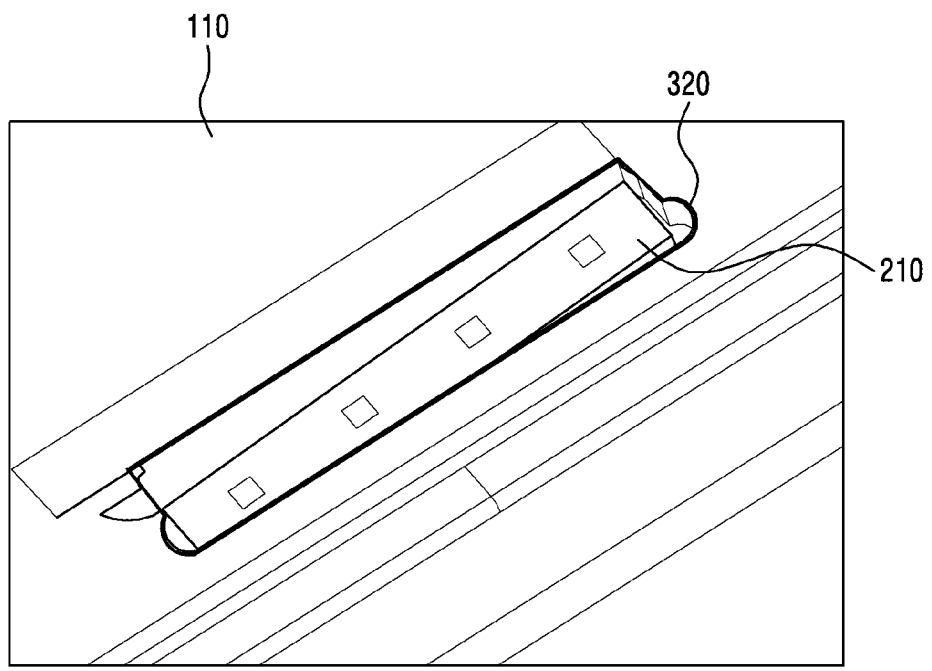
FIG. 10F illustrates an electronic device in case that the first antenna module forms a predetermined angle with respect to the rear surface of the first housing and a first direction according to an example embodiment.

FIG. 10F illustrates an electronic device 100 in which the first antenna module 210 is disposed in the placement portion 320 to form a beam pattern (e.g., the beam pattern 510 or 520) in a direction between the −z axis and the +x axis of FIG. 10F while forming a predetermined angle (e.g., an angle between 0° and 90°) with the rear surface of the first housing 110 (e.g., the surface of the first housing 110 located in the +z axis direction in FIG. 10F).

Referring to FIG. 10F, in the case where the first antenna module 210 is placed in the placement portion 320, the placement portion 320 may be configured such that the first antenna module 210 forms a predetermined angle (e.g., an angle between 0° and 90°) with respect to the rear surface of the first housing 110 and the first direction (e.g., the +x-axis direction or the −x-axis direction in FIG. 10F). For example, the placement portion 320 in which the first antenna module 210 is accommodated may be inclined so that the first antenna module 210 forms an angle of 30° with respect to the rear surface of the first housing 110 and the +x-axis direction of FIG. 1.

According to an embodiment, the first antenna module 210 may be fixed to the placement portion 320 by an adhesive 310 or a support member 401.

In the case where the electronic device 100 according to an embodiment is a V-fold type electronic device and the first antenna module 210 is placed in the placement portion 320, when the placement portion 320 is disposed to form a beam pattern 510 or 520 in FIG. 5 in a direction between the −z axis and the +x axis of 10F, the beam pattern may be formed toward the air rather than being directed to a floor when the second housing 120 of the electronic device 100 is placed on the floor. In an example, when a beam pattern formed by the first antenna module 210 included in a V-fold type electronic device is directed toward the air, radiation performance may be improved compared to a case where the beam pattern is directed toward the floor.

Figure 10G:
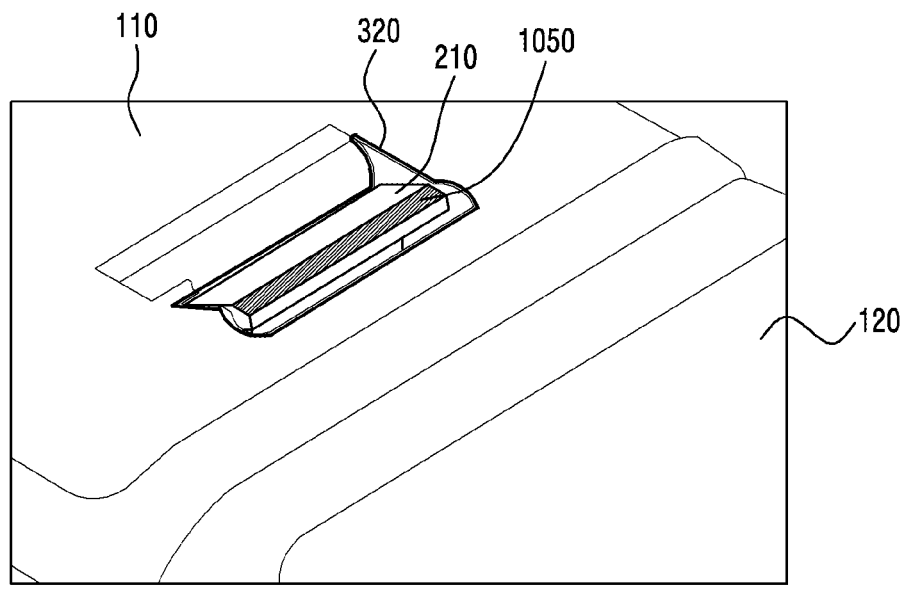
FIG. 10G illustrates an electronic device in case that at least a portion of the first antenna module has a cut surface according to an example embodiment.

FIG. 10G illustrates an electronic device 100 when at least a portion of the first antenna module 210 according to an embodiment includes a cut surface 1050.

Referring to FIG. 10G, when the placement portion 320 is disposed such that the first antenna module 210 forms a beam pattern (e.g., the beam pattern 510 or 520 of FIG. 5) in a direction between the −z axis and the +y axis of FIG. 10G, at least a portion of the first antenna module 210 may include a cut surface 1050.

According to an embodiment, when one surface of the placement portion 320 on which the first antenna module 210 is placed is disposed to form a predetermined angle (e.g., 0 angle between 0° and 90°) with the rear surface of the first housing 110 between the −z axis and the +y axis, at least a portion of the first antenna module 210 may be cut out such that at least a portion of the first antenna module 210 does not protrude out of the rear surface of the first housing 110. For example, at least a portion of the first antenna module 210 may have a cut surface 1050 such that at least a portion of the first antenna module 210 does not protrude out of the rear surface of the first housing 110. In an example, the cut surface 1050 may include only a printed circuit board area excluding an antenna portion configured to transmit and/or receive signals by the first antenna module 210.

Figure 11A:
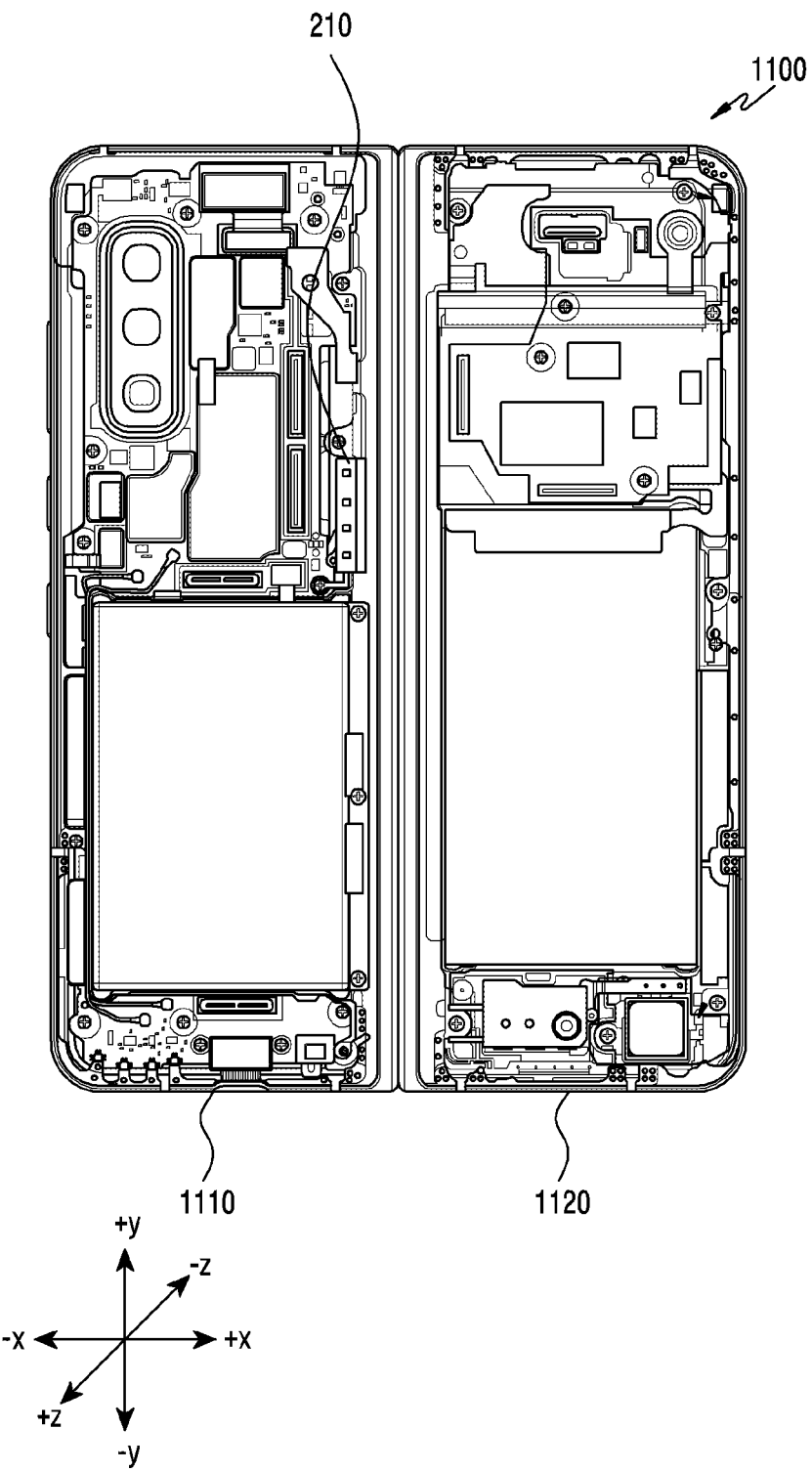
FIG. 11A illustrates a V-fold type electronic device in which the first antenna module is disposed according to an example embodiment.
Figure 11B:
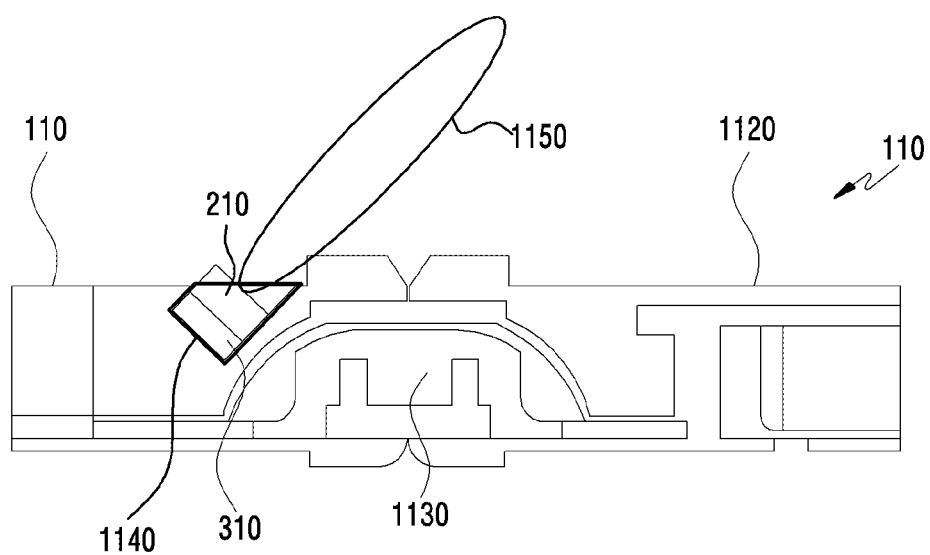
FIG. 11B illustrates antenna radiation of a first antenna module in a V-fold type electronic device according to an example embodiment.

FIG. 11A illustrates a V-fold type electronic device 1100 in which the first antenna module 210 according to an embodiment is disposed. FIG. 11B illustrates antenna radiation of the first antenna module in the V-fold type electronic device according to an embodiment. In the descriptions of the electronic device 100 made with reference to FIGS. 1 to 10G, the descriptions regarding features that are not contrary to the electronic device 1100 may be substantially equally applied to the electronic device 1100.

Referring to FIGS. 11A and 11B, the electronic device 1100 may include a first housing 1110, a second housing 1120, and a hinge structure 1130.

According to an embodiment, the first antenna module 210 may be disposed in one area of the first housing 1110 of the electronic device 1100. For example, in one area of the first housing 1110 of the electronic device 1100 adjacent to the hinge structure 1130 of the electronic device 1100, the first antenna module 210 may be disposed along the hinge structure 1130 of the electronic device 1100.

According to an embodiment, the first antenna module 210 may be disposed while being fixed to the placement portion 1140 in the electronic device 1100 via an adhesive 310. For example, the first antenna module 210 may be placed while being fixed to the placement portion 1140 provided in one area of the first housing 1110 of the electronic device 1100 via the adhesive 310.

According to an embodiment, one surface of the placement portion 1140 on which the first antenna module 210 is disposed in the electronic device 1100 may form a predetermined angle with the rear surface of the first housing 1110 of the electronic device 1100. In an example, the one surface of the placement portion 1140 on which the first antenna module 210 is disposed in the electronic device 1100 may be inclined to form an angle between 0° and 90° with a plane defined by the rear surface of the first housing 1110 of the electronic device 1100.

According to an embodiment, the first antenna module 210 accommodated in the placement portion 1140 in the electronic device 1100 may form a beam pattern toward the hinge structure 1130 of the electronic device 1100 (e.g., in the +x-axis direction in FIG. 11A). For example, when the placement portion 1140 in the electronic device 1100 is disposed to form an angle of 45° with the rear surface of the first housing 1110 of the electronic device 1100 (e.g., the surface of the first housing 1110 located in the +z-axis direction in FIG. 11A), the first antenna module 210 placed in the placement portion 1140 in the electronic device 1100 may form a beam pattern facing a direction forming an angle of 45° with each of the rear surface of the first housing 1110 of the electronic device 1100 and a direction toward the hinge structure 1130 (e.g., the +x-axis direction in FIG. 11A) (e.g., a direction forming an angle of 45° with each of the +x axis and the +z axis in FIG. 11A).

Figure 12:
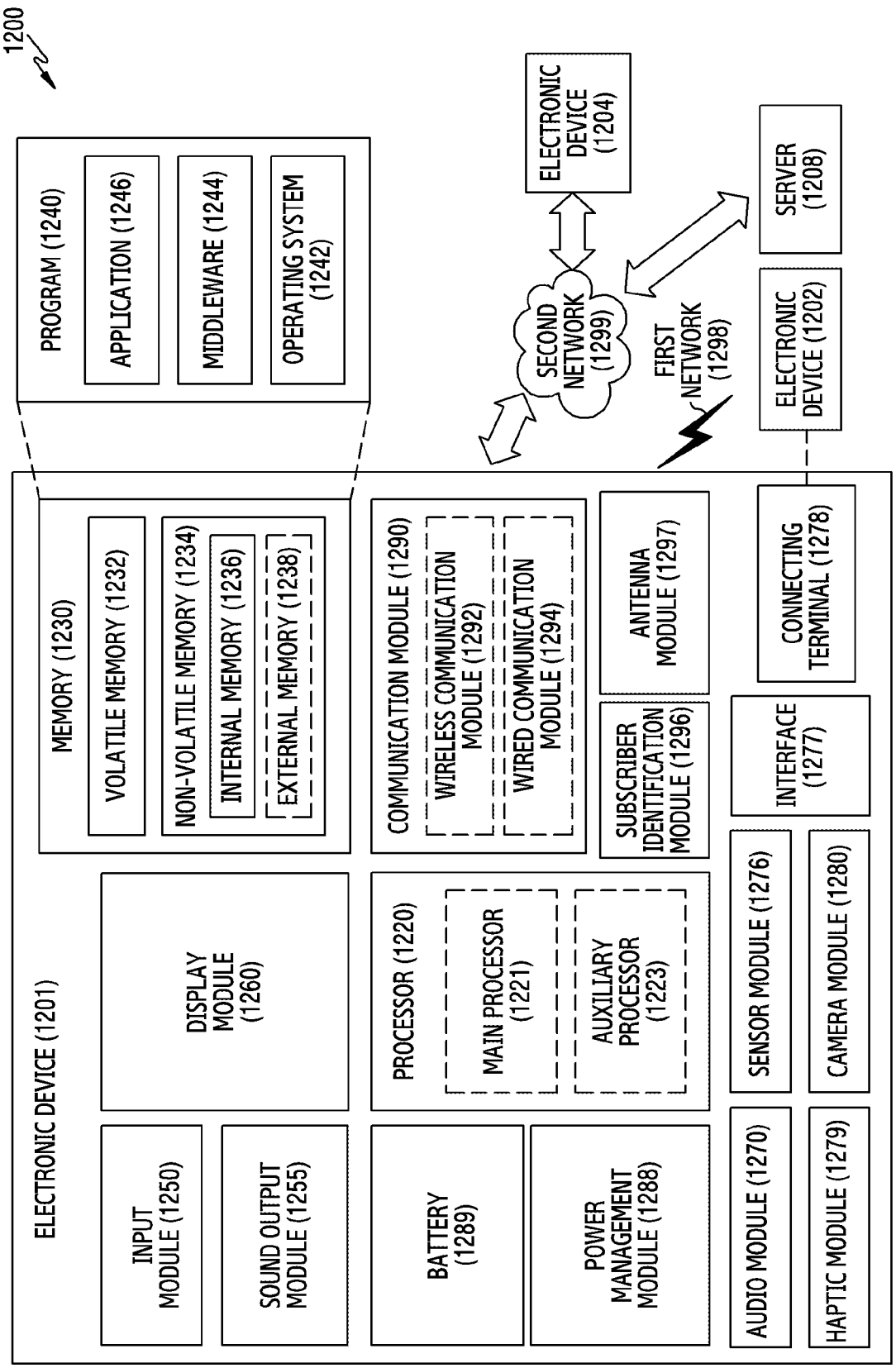
FIG. 12 is a block diagram of an electronic device in a network environment according to various example embodiments.

FIG. 12 is a block diagram illustrating an electronic device 1201 in a network environment 1200 according to various embodiments.

Referring to FIG. 12, the electronic device 1201 in the network environment 1200 may communicate with an electronic device 1202 via a first network 1298 (e.g., a short-range wireless communication network), or at least one of an electronic device 1204 or a server 1208 via a second network 1299 (e.g., a long-range wireless communication network). According to an embodiment, the electronic device 1201 may communicate with the electronic device 1204 via the server 1208. According to an embodiment, the electronic device 1201 may include a processor 1220, memory 1230, an input module 1250, a sound output module 1255, a display module 1260, an audio module 1270, a sensor module 1276, an interface 1277, a connecting terminal 1278, a haptic module 1279, a camera module 1280, a power management module 1288, a battery 1289, a communication module 1290 comprising communication circuitry, a subscriber identification module (SIM) 1296, or an antenna module 1297. In some embodiments, at least one of the components (e.g., the connecting terminal 1278) may be omitted from the electronic device 1201, or one or more other components may be added in the electronic device 1201. In some embodiments, some of the components (e.g., the sensor module 1276, the camera module 1280, or the antenna module 1297) may be implemented as a single component (e.g., the display module 1260).

The processor 1220 may execute, for example, software (e.g., a program 1240) to control at least one other component (e.g., a hardware or software component) of the electronic device 1201 coupled, directly or indirectly, with the processor 1220, and may perform various data processing or computation. According to an embodiment, as at least part of the data processing or computation, the processor 1220 may store a command or data received from another component (e.g., the sensor module 1276 or the communication module 1290) in volatile memory 1232, process the command or the data stored in the volatile memory 1232, and store resulting data in non-volatile memory 1234. According to an embodiment, the processor 1220 may include a main processor 1221 (e.g., a central processing unit (CPU) or an application processor (AP)), or an auxiliary processor 1223 (e.g., a graphics processing unit (GPU), a neural processing unit (NPU), an image signal processor (ISP), a sensor hub processor, or a communication processor (CP)) that is operable independently from, or in conjunction with, the main processor 1221. For example, when the electronic device 1201 includes the main processor 1221 and the auxiliary processor 1223, the auxiliary processor 1223 may be adapted to consume less power than the main processor 1221, or to be specific to a specified function. The auxiliary processor 1223 may be implemented as separate from, or as part of the main processor 1221.

The auxiliary processor 1223 may control at least some of functions or states related to at least one component (e.g., the display module 1260 comprising a display, the sensor module 1276 comprising a sensor, and/or the communication module 1290 comprising communication circuitry) among the components of the electronic device 1201, instead of the main processor 1221 while the main processor 1221 is in an inactive (e.g., sleep) state, or together with the main processor 1221 while the main processor 1221 is in an active state (e.g., executing an application). According to an embodiment, the auxiliary processor 1223 (e.g., an image signal processor or a communication processor) may be implemented as part of another component (e.g., the camera module 1280 or the communication module 1290) functionally related to the auxiliary processor 1223. According to an embodiment, the auxiliary processor 1223 (e.g., the neural processing unit) may include a hardware structure specified for artificial intelligence model processing. An artificial intelligence model may be generated by machine learning. Such learning may be performed, e.g., by the electronic device 1201 where the artificial intelligence is performed or via a separate server (e.g., the server 1208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input module 1250 may receive a command or data to be used by another component (e.g., the processor 1220) of the electronic device 1201, from the outside (e.g., a user) of the electronic device 1201. The input module 1250 may include, for example, a microphone, a mouse, a keyboard, a key (e.g., a button), or a digital pen (e.g., a stylus pen).

The sound output module 1255 may output sound signals to the outside of the electronic device 1201. The sound output module 1255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1260 may visually provide information to the outside (e.g., a user) of the electronic device 1201. The display module 1260 may include, for example, a display, a hologram device, or a projector and control circuitry to control a corresponding one of the display, hologram device, and projector. According to an embodiment, the display module 1260 may include a touch sensor adapted to detect a touch, or a pressure sensor adapted to measure the intensity of force incurred by the touch.

The audio module 1270 may convert a sound into an electrical signal and vice versa. According to an embodiment, the audio module 1270 may obtain the sound via the input module 1250, or output the sound via the sound output module 1255 or a headphone of an external electronic device (e.g., an electronic device 1202) directly (e.g., wiredly) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. According to an embodiment, the sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device (e.g., the electronic device 1202) directly (e.g., wiredly) or wirelessly. According to an embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device (e.g., the electronic device 1202). According to an embodiment, the connecting terminal 1278 may include, for example, a HDMI connector, a USB connector, a SD card connector, or an audio connector (e.g., a headphone connector).

The haptic module 1279 may convert an electrical signal into a mechanical stimulus (e.g., a vibration or a movement) or electrical stimulus which may be recognized by a user via his tactile sensation or kinesthetic sensation. According to an embodiment, the haptic module 1279 may include, for example, a motor, a piezoelectric element, or an electric stimulator.

The camera module 1280 may capture a still image or moving images. According to an embodiment, the camera module 1280 may include one or more lenses, image sensors, image signal processors, or flashes.

The power management module 1288 may manage power supplied to the electronic device 1201. According to an embodiment, the power management module 1288 may be implemented as at least part of, for example, a power management integrated circuit (PMIC).

The battery 1289 may supply power to at least one component of the electronic device 1201. According to an embodiment, the battery 1289 may include, for example, a primary cell which is not rechargeable, a secondary cell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the application processor (AP)) and supports a direct (e.g., wired) communication or a wireless communication. According to an embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or infrared data association (IrDA)) or the second network 1299 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The wireless communication module 1292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1292 may support a high-frequency band (e.g., the mmWave band) to achieve, e.g., a high data transmission rate. The wireless communication module 1292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1292 may support various requirements specified in the electronic device 1201, an external electronic device (e.g., the electronic device 1204), or a network system (e.g., the second network 1299). According to an embodiment, the wireless communication module 1292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1297 may transmit or receive a signal or power to or from the outside (e.g., the external electronic device) of the electronic device 1201. According to an embodiment, the antenna module 1297 may include an antenna including a radiating element composed of a conductive material or a conductive pattern formed in or on a substrate (e.g., a printed circuit board (PCB)). According to an embodiment, the antenna module 1297 may include a plurality of antennas (e.g., array antennas). In such a case, at least one antenna appropriate for a communication scheme used in the communication network, such as the first network 1298 or the second network 1299, may be selected, for example, by the communication module 1290 (e.g., the wireless communication module 1292) from the plurality of antennas. The signal or the power may then be transmitted or received between the communication module 1290 and the external electronic device via the selected at least one antenna. According to an embodiment, another component (e.g., a radio frequency integrated circuit (RFIC)) other than the radiating element may be additionally formed as part of the antenna module 1297.

According to various embodiments, the antenna module 1297 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1201 and the external electronic device 1204 via the server 1208 coupled, directly or indirectly, with the second network 1299. Each of the electronic devices 1202 or 1204 may be a device of a same type as, or a different type, from the electronic device 1201. According to an embodiment, all or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, mobile edge computing (MEC), or client-server computing technology may be used, for example. The electronic device 1201 may provide ultra low-latency services using, e.g., distributed computing or mobile edge computing. In another embodiment, the external electronic device 1204 may include an internet-of-things (IoT) device. The server 1208 may be an intelligent server using machine learning and/or a neural network. According to an embodiment, the external electronic device 1204 or the server 1208 may be included in the second network 1299. The electronic device 1201 may be applied to intelligent services (e.g., smart home, smart city, smart car, or healthcare) based on 5G communication technology or IoT-related technology.

Figure 13:
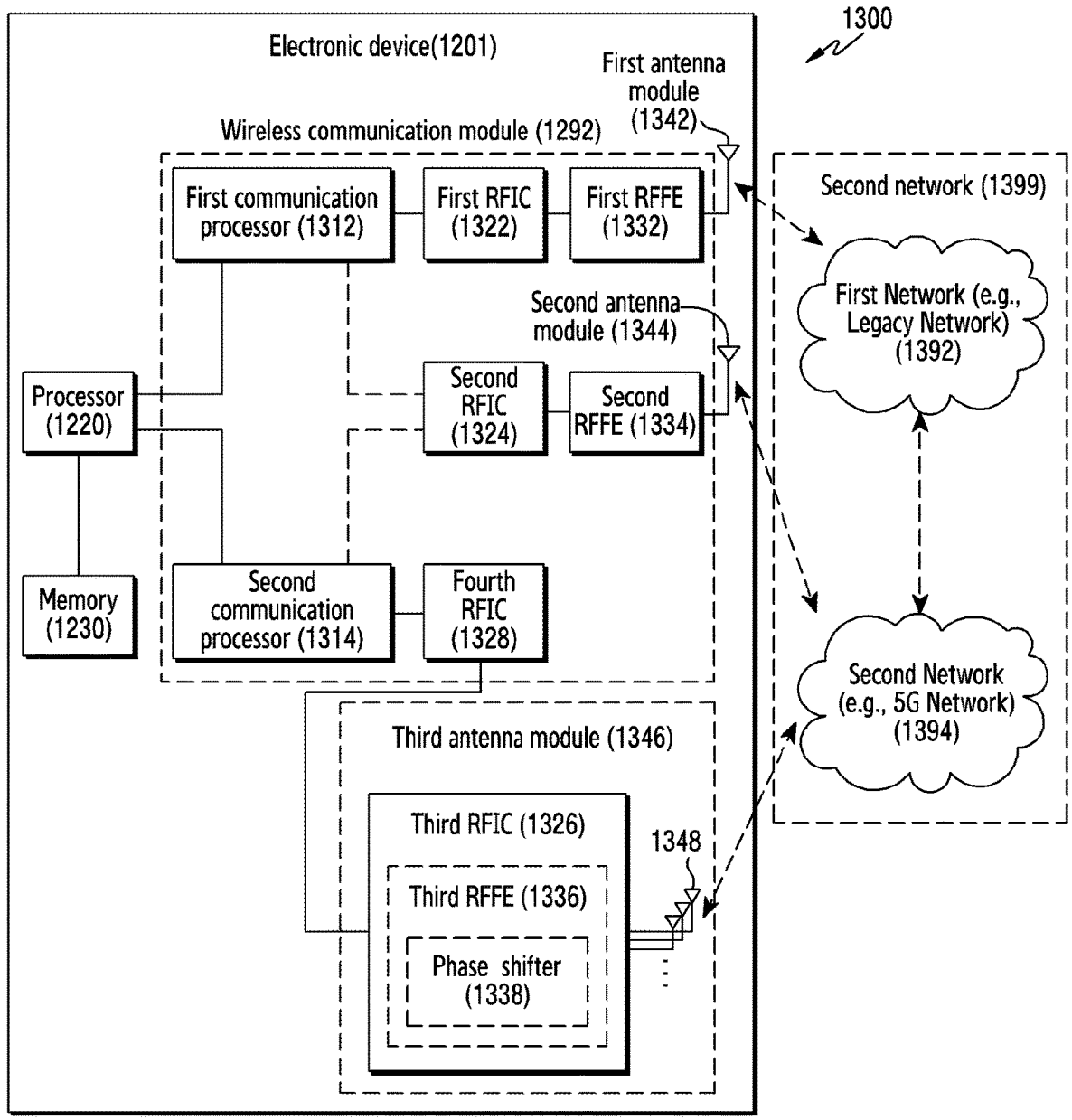
FIG. 13 is a block diagram of an electronic device in a network environment including multiple cellular networks according to various example embodiments.

FIG. 13 is a block diagram of an electronic device 1201 according to various embodiments in a network environment 1300 including multiple cellular networks.

Referring to FIG. 13, the electronic device 1201 (e.g., the electronic device 100 in FIG. 1) may include a first communication processor 1312, a second communication processor 1314, a first radio frequency integrated circuit (RFIC) 1322, a second RFIC 1324, a third RFIC 1326, a fourth RFIC 1328, a first radio frequency front end (RFFE) 1332, a second RFFE 1334, a first antenna module 1342, a second antenna module 1344, and an antenna 1348. The electronic device 1201 may further include a processor 1220 and a memory 1230. The second network 1299 may include a first cellular network 1392 and a second cellular network 1394. According to another embodiment, the electronic device 1201 may further include at least one of the components illustrated in FIGS. 1A and 1B, and the second network 1299 may further include one or more other networks. According to an embodiment, the first communication processor 1312, the second communication processor 1314, the first RFIC 1322, the second RFIC 1324, the fourth RFIC 1328, the first RFFE 1332, and the second RFFE 1334 may configure at least a portion of an RF communication module 1292. According to another embodiment, the fourth RFIC 1328 may be omitted, or may be included as a portion of the third RFIC 1326.

The first communication processor 1312 may establish a communication channel in a band to be used for RF communication with the first cellular network 1392 and may support legacy network communication via the established communication channel According to various embodiments, the first cellular network may be a legacy network including a 2nd generation (2G), 3G, 4G, or long-term evolution (LTE) network. The second communication processor 1314 may establish a communication channel corresponding to a pre-determined band (e.g., about 6 GHz to about 60 GHz) in a band to be used for RF communication with the second cellular network 1394 and may support 5G network communication via the established communication channel According to various embodiments, the second cellular network 1394 may be a 5G network defined in the 3 GPP. In addition, according to an embodiment, the first communication processor 1312 or the second communication processor 1314 may establish a communication channel corresponding to another predetermined band (e.g., about 6 GHz or lower) in the band to be used for RF communication with the second cellular network 1394 and may support 5G network communication via the established communication channel According to an embodiment, the first communication processor 1312 and the second communication processor 1314 may be implemented in a single chip or in a single package. According to various embodiments, the first communication processor 1312 or the second communication processor 1314 may be configured in a single chip or a single package with the processor 1220, an auxiliary processor 1223, or a communication module 1290.

According to an embodiment, the first communication processor 1312 and the second communication processor 1314 may be directly or indirectly connected to each other by an interface (not illustrated) to provide or receive data or control signals in one direction or both directions.

During transmission, the first RFIC 1322 may convert a baseband signal generated by the first communication processor 1312 into an RF signal of about 700 MHz to about 3 GHz to be used in the first cellular network 1392 (e.g., a legacy network). During reception, an RF signal may be acquired from the first cellular network 1392 (e.g., a legacy network) via an antenna (e.g., the first antenna module 1342) and may be preprocessed through an RFFE (e.g., the first RFFE 1332). The first RFIC 1322 may convert the preprocessed RF signal into a baseband signal to be processed by the first communication processor 1312.

During transmission, the second RFIC 1324 may convert a baseband signal generated by the first communication processor 1312 or the second communication processor 1314 into an RF signal in a Sub6 band (e.g., about 6 GHz or lower) (hereinafter, referred to as a "5G Sub6 RF signal") to be used in the second cellular network 1394 (e.g., a 5G network). During reception, the 5G Sub6 RF signal may be acquired from the second cellular network 1394 (e.g., a 5G network) via an antenna (e.g., the second antenna module 1344) and may be preprocessed through an RFFE (e.g., the second RFFE 1334). The second RFIC 1324 may convert the preprocessed 5G Sub6 RF signal into a baseband signal to be processed by a corresponding one of the first communication processor 1312 or the second communication processor 1314.

The third RFIC 1326 may convert the baseband signal generated by the second communication processor 1314 into an RF signal in a 5G Above6 band (e.g., about 6 GHz to about 60 GHz) (hereinafter, referred to as a "5G Above6 RF signal") to be used in the second cellular network 1394 (e.g., a 5G network). During reception, the 5G Above6 RF signal may be acquired from the second cellular network 1394 (e.g., a 5G network) via an antenna (e.g., the second antenna module 1348) and may be preprocessed through the third RFFE 1336. The third RFIC 1326 may convert the preprocessed 5G Above6 RF signal into a baseband signal to be processed by the second communication processor 1314. According to an embodiment, the third RFFE 1336 may be provided as a portion of the third RFIC 1326.

According to an embodiment, the electronic device 1201 may include a fourth RFIC 1328 separately from the third RFIC 1326 or as at least a portion of the third RFIC 1326. In this case, the fourth RFIC 1328 may convert the baseband signal generated by the second communication processor 1314 into an RF signal (hereinafter, referred to as an "IF signal") in an intermediate-frequency band (e.g., about 9 GHz to about 11 GHz) and may then deliver the IF signal to the third RFIC 1326. The third RFIC 1326 may convert the IF signal into a 5G Above6 RF signal. During reception, the 5G Above6 RF signal may be acquired from the second cellular network 1394 (e.g., a 5G network) via an antenna (e.g., the antenna 1348) and may be converted into an IF signal by the third RFIC 1326. The fourth RFIC 1328 may convert the IF signal into a baseband signal to be processed by the second communication processor 1314.

According to an embodiment, the first RFIC 1322 and the second RFIC 1324 may be implemented as at least a portion of a single chip or a single package. According to an embodiment, the first RFFE 1332 and the second RFFE 1334 may be implemented as at least a portion of a single chip or a single package. According to an embodiment, at least one of the first antenna module 1342 or the second antenna module 1344 may be omitted or may be combined with another antenna module to process RF signals of multiple corresponding bands.

According to an embodiment, the third RFIC 1326 and the antenna 1348 may be disposed on the same substrate to provide a third antenna module 1346. For example, the RF communication module 1292 or the processor 1220 may be placed on a first substrate (e.g., a main PCB). In such a case, the third RFIC 1326 may be disposed on one partial area (e.g., the top surface) of a second substrate (e.g., a sub-PCB) separate from the first substrate and the antenna 1348 may be disposed on another partial area (e.g., the bottom surface) to provide the third antenna module 1346. By disposing the third RFIC 1326 and the antenna 1348 on the same substrate, it is possible to reduce the length of the transmission line therebetween. Through this, it is possible to reduce the loss (e.g., attenuation) of signals in a high-frequency band (e.g., about 6 GHz to about 60 GHz) to be used for, for example, 5G network communication by the transmission line. As a result, the electronic device 1201 is able to improve the quality or speed of communication with the second cellular network 1394 (e.g., a 5G network).

According to an embodiment, the antenna 1348 may be configured as an antenna array that includes multiple antenna elements capable of being used for beamforming. In this case, the third RFIC 1326 may include multiple phase shifters 1338 corresponding to the multiple antenna elements, for example, as a portion of the third RFFE 1336. During transmission, each of the multiple phase shifters 1338 may convert the phase of a 5G Above6 RF signal to be transmitted to the outside of the electronic device 1201 (e.g., a base station of a 5G network) via a corresponding antenna element. During reception, each of the multiple phase shifters 1338 may convert the phase of the 5G Above6 RF signal received from the outside into the same or substantially the same phase via the corresponding antenna element. This enables transmission or reception through beamforming between the electronic device 1201 and the outside.

The second cellular network 1394 (e.g., a 5G network) may be operated independently from the first cellular network 1392 (e.g., a legacy network) (e.g., standalone (SA)) or may be operated in the state of being connected to the first cellular network 1392 (e.g., non-standalone (NSA)). For example, in a 5G network, only an access network (e.g., a 5G radio access network (RAN) or a next-generation RAN (NG RAN)) may exist, but a core network (e.g., a next-generation core (NGC)) may not exist. In this case, after accessing the access network of the 5G network, the electronic device 1201 may access an external network (e.g., the Internet) under the control of the core network (e.g., an evolved packed core (EPC)) of a legacy network. Protocol information for communication with a legacy network (e.g., LTE protocol information) or protocol information for communication with a 5G network (e.g., new radio (NR) protocol information) may be stored in the memory 1230 and may be accessed by another component (e.g., the processor 1220, the first communication processor 1312, or the second communication processor 1314).

An electronic device according to various embodiments may include a first housing, a second housing coupled, directly or indirectly, to the first housing via a hinge structure to be rotatable relative to the first housing about a first axis that oriented in a first direction, an antenna module, and at least one processor electrically connected to the antenna module. The hinge structure may be disposed in an area centered on the first axis and having a first width in a third direction perpendicular to each of the first direction and a second direction, which is perpendicular to the first direction and is faced by the rear surface of the first housing, and the first housing may include a first structure that covers the hinge structure within the first width. The first structure may be provided with a placement portion in which the antenna module is accommodated to form a predetermined angle with the rear surface of the first housing, and the at least one processor may be configured to transmit and/or receive a signal having a frequency between 3 GHz and 100 GHz in the first direction or in a direction between the second direction and the third direction by using the antenna module.

The electronic device according to an embodiment may further include a battery, the first housing may include a second structure in which the battery is accommodated, and the antenna module may be placed in the placement portion between the battery and the first axis.

According to an embodiment, the antenna module is a first antenna module, and the electronic device may further include a second antenna module, and the second antenna module is accommodated in a third structure provided along a side surface of the first housing. The at least one processor may be configured to transmit/receive a mmWave signal corresponding to the first direction or the second direction by using the second antenna module.

According to an embodiment, the antenna module may be a patch array antenna.

According to an embodiment, the antenna module may be accommodated while being fixed to the placement portion by a fastener and an adhesive.

According to an embodiment, the fastener may be configured with a hook or a screw.

According to an embodiment, the first axis may correspond to an axis of a shorter one among a width and a length of the electronic device.

According to an embodiment, the placement portion may be configured such that the antenna module forms a predetermined angle with respect to the rear surface of the electronic device and the first direction.

According to an embodiment, the placement portion in which the antenna module is accommodated is formed of a metallic material.

The electronic device according to an embodiment may further include a heat dissipation structure, comprising heat dissipation material, therein.

The electronic device according to an embodiment may further include a printed circuit board (PCB).

According to an embodiment, an area that a beam of the antenna module forms is formed of air or a conductive material.

According to an embodiment, at least a portion of the conductive material may include a curved surface or an oblique line.

According to an embodiment, at least a portion of the antenna module may include a cut surface.

According to an embodiment, the signal having the frequency between 3 GHz and 100 GHz may be a signal in a frequency band of 24.25 GHz or 40 GHz.

According to various embodiments, an electronic device may include a first housing, a second housing coupled, directly or indirectly, to the first housing via a hinge structure to be rotatable relative to the first housing about a first axis that oriented in a first direction, an antenna module, a flexible display defining the front surface of the electronic device and disposed over the first housing and the second housing, and at least one processor electrically connected to the antenna module. The hinge structure may be disposed in an area centered on the first axis and having a first width in a third direction perpendicular to each of the first direction and a second direction, which is perpendicular to the first direction and is faced by the rear surface of the first housing, and the first housing may include a first structure that covers the hinge structure within the first width. The first structure may be provided with a placement portion in which the antenna module is accommodated to form a predetermined angle with the rear surface of the first housing, and the at least one processor may be configured to transmit and/or receive a signal having a frequency between 3 GHz and 100 GHz (from 3-100 GHz) in the first direction or in a direction between the second direction and the third direction by using the antenna module.

The electronic device according to an embodiment may further include a battery, the first housing may include a second structure in which the battery is accommodated, and the antenna module may be disposed in the placement portion between the battery and the first axis.

According to an embodiment, the antenna module is a first antenna module, and the electronic device may further include a second antenna module, and the second antenna module is accommodated in a third structure provided along a side surface of the first housing. The at least one processor may be configured to transmit/receive a mmWave signal corresponding to the first direction or the second direction by using the second antenna module.

According to an embodiment, the antenna module may be a patch array antenna.

According to an embodiment, the flexible display may be configured to be at least partially bent when the second housing rotates relative to the first housing about a first axis.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 1240) including one or more instructions that are stored in a storage medium (e.g., internal memory 1236 or external memory 1238) that is readable by a machine (e.g., the electronic device 1201). For example, a processor (e.g., the processor 1220) of the machine (e.g., the electronic device 1201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStoreTM), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
a first housing;
a second housing coupled to the first housing via a hinge to be rotatable to the first housing about a first axis that oriented in a first direction;
an antenna module comprising at least one antenna; and
at least one processor electrically connected to the antenna module,
wherein, about the first axis, the hinge is disposed in an area having a first width in a third direction perpendicular to each of the first direction and a second direction, which is perpendicular to the first direction and is faced by a rear surface of the first housing,
wherein the first housing comprises a first structure, comprising a cover, that covers the hinge at least within the first width,
wherein the first structure comprises a placement portion in which the antenna module is accommodated to form a predetermined angle with the rear surface of the first housing, and
wherein the at least one processor is configured to transmit and/or receive a signal having a frequency between 3 GHz and 100 GHz in the first direction and/or in a direction between the second direction and the third direction by using the antenna module.

2. The electronic device of claim 1, further comprising a battery,
wherein the first housing comprises a second structure, comprising at least a housing part, in which the battery is accommodated, and
wherein the antenna module is located at least partially in the placement portion between the battery and the first axis.

3. The electronic device of claim 1, wherein the antenna module is a first antenna module,
wherein the electronic device further comprises a second antenna module comprising at least one antenna,
wherein the second antenna module is accommodated in a third structure, comprising at least a housing part, provided along a side surface of the first housing, and
wherein the at least one processor is configured to transmit and/or receive a mmWave signal corresponding to the first direction and/or the second direction by using the second antenna module.

4. The electronic device of claim 1, wherein the antenna module comprises a patch array antenna.

5. The electronic device of claim 1, wherein the antenna module is accommodated while being fixed to the placement portion by a fastener and an adhesive.

6. The electronic device of claim 5, wherein the fastener is configured with a hook and/or a screw.

7. The electronic device of claim 1, wherein the first axis corresponds to an axis of a shorter one among a width and a length of the electronic device.

8. The electronic device of claim 7, wherein the placement portion is configured such that the antenna module forms a predetermined angle with respect to the rear surface of the electronic device and the first direction.

9. The electronic device of claim 1, wherein the placement portion in which the antenna module is accommodated comprises a metallic material.

10. The electronic device of claim 1, further comprising a heat dissipation structure, comprising heat dissipation material, inside the electronic device.

11. The electronic device of claim 1, further comprising a printed circuit board (PCB).

12. The electronic device of claim 1, wherein an area that a beam of the antenna module forms is formed of air or a conductive material.

13. The electronic device of claim 12, wherein at least a portion of the conductive material comprises a curved surface and/or an oblique line.

14. The electronic device of claim 1, wherein at least a portion of the antenna module comprises a cut surface.

15. The electronic device of claim 1, wherein the signal having the frequency between 3 GHz and 100 GHz comprises a signal in a frequency band of 24.25 GHz or 40 GHz.

16. An electronic device comprising:
a first housing,
a second housing coupled to the first housing via a hinge to be rotatable to the first housing about a first axis that oriented in a first direction,
an antenna module comprising at least one antenna,
a flexible display forming a front surface of the electronic device and disposed over the first housing and the second housing, and
at least one processor electrically connected to the antenna module,
wherein the hinge is disposed in an area centered on the first axis and having a first width in a third direction perpendicular to each of the first direction and a second direction, the second direction being perpendicular to the first direction and being faced by a rear surface of the first housing,
wherein the first housing comprises a first structure that covers the hinge within the first width,
wherein the first structure comprises a placement portion in which the antenna module is accommodated to form a predetermined angle with the rear surface of the first housing, and
wherein the at least one processor is configured to transmit and/or receive a signal having a frequency between 3 GHz and 100 GHz in the first direction or in a direction between the second direction and the third direction by using the antenna module.

17. The electronic device of claim 16, further comprising:
a battery,
wherein the first housing comprises a second structure in which the battery is accommodated, and
wherein the antenna module is disposed in the placement portion between the battery and the first axis.

18. The electronic device of claim 16, wherein the antenna module is a first antenna module,
wherein the electronic device further comprises a second antenna module,
wherein the second antenna module is accommodated in a third structure formed along a side surface of the first housing, and
wherein the at least one processor is configured to transmit and/or receive a mmWave signal corresponding to the first direction or the second direction by using the second antenna module.

19. The electronic device of claim 16, the antenna module comprises a patch array antenna.

20. The electronic device of claim 16, wherein the flexible display is formed to be at least partially bent in case that the second housing rotates relative to the first housing about the first axis.

* * * * *